US012592665B2

(12) United States Patent
    Singh

(10) Patent No.: US 12,592,665 B2
(45) Date of Patent: Mar. 31, 2026

(54) SELF SUPPORTING SOLAR SOLUTION

(71) Applicant: Wind Turbine & Energy Cables, Corp., Hasbrouck Heights, NJ (US)

(72) Inventor: Orin B. Singh, Hasbrouck Heights, NJ (US)

(73) Assignee: Wind Turbine & Energy Cables, Corp., Hasbrouck Heights, NJ (US)

( * ) Notice: Subject to any disclaimer, the term of this patent is extended or adjusted under 35 U.S.C. 154(b) by 0 days.

(21) Appl. No.: 19/372,405

(22) Filed: Oct. 29, 2025

(65) Prior Publication Data

US 2026/0058602 A1     Feb. 26, 2026

Related U.S. Application Data

(63) Continuation of application No. 19/295,119, filed on Aug. 8, 2025, which is a continuation of application No. 19/040,207, filed on Jan. 29, 2025, now Pat. No. 12,418,260, which is a continuation of application No. 18/989,980, filed on Dec. 20, 2024.

(60) Provisional application No. 63/680,776, filed on Aug. 8, 2024, provisional application No. 63/613,885, filed on Dec. 22, 2023.

(51) Int. Cl.
    *H02S 40/36*      (2014.01)
    *H02J 3/38*       (2006.01)
    *H02J 101/24*     (2026.01)

(52) U.S. Cl.
    CPC ............... *H02S 40/36* (2014.12); *H02J 3/38* (2013.01); *H02J 2101/24* (2026.01)

(58) Field of Classification Search
    CPC ...................................... H02S 40/36
    USPC ........................................ 174/71
    See application file for complete search history.

(56) References Cited

U.S. PATENT DOCUMENTS 12,542,224  B2 *   2/2026   Cevallos Navarrete .....................
                                          H01B 7/046
2016/0072431  A1    3/2016   Solon
2016/0111573  A1    4/2016   Meyer et al.
2022/0060141  A1    2/2022   Felton
2023/0231329  A1    7/2023   Dossmann et al.
2024/0021339  A1 *  1/2024   Holcombe .............. H01B 5/08
                  (Continued)

FOREIGN PATENT DOCUMENTS

CN          115595474  A       1/2023

OTHER PUBLICATIONS

Snake Tray Brochure [online]. Snake Tray. 2020 [retrieved on Feb. 6, 2025]. Retrieved from the internet: https//webarchive.org/weh/20221126211701/https:www.snaketray.com/wp-content/uploads/2020/04/snake-tray-solar-brochure.pdf.
                  (Continued)

*Primary Examiner* — Stanley Tso
(74) *Attorney, Agent, or Firm* — Jeffrey B. Fabian; Shumaker, Loop & Kendrick, LLP

(57) ABSTRACT

An electrical bus system has a trunk bus that includes at least one positive bus line, an equal number of negative bus line, and a ground cable. The trunk bus lines extend through clamping blocks where some of the clamping blocks are coupled to brackets that are themselves coupled to vertical supports. The ground cable is coupled to vertical support using the bracket. Multi-tap shear bolt connectors are used to connect the trunk bus line to photovoltaic wires carrying the output from one or more solar panel arrays, thereby eliminating the need for combiner boxes used in conventional systems.

14 Claims, 20 Drawing Sheets

131

(56) References Cited

U.S. PATENT DOCUMENTS

2024/0364259 A1    10/2024   He
2025/0125556 A1     4/2025   Elmes et al.

OTHER PUBLICATIONS

International Search Report and Written Opinion issued by the
International Searching Authority on Apr. 22, 2025 for international
patent application No. PCT/US2024/061321.

* cited by examiner

132
Messenger Cable

134
Positive Trunk Bus Line

136
Negative Trunk Bus Line

150
Hanger

138
Grounding Line 152          132

115

150          130

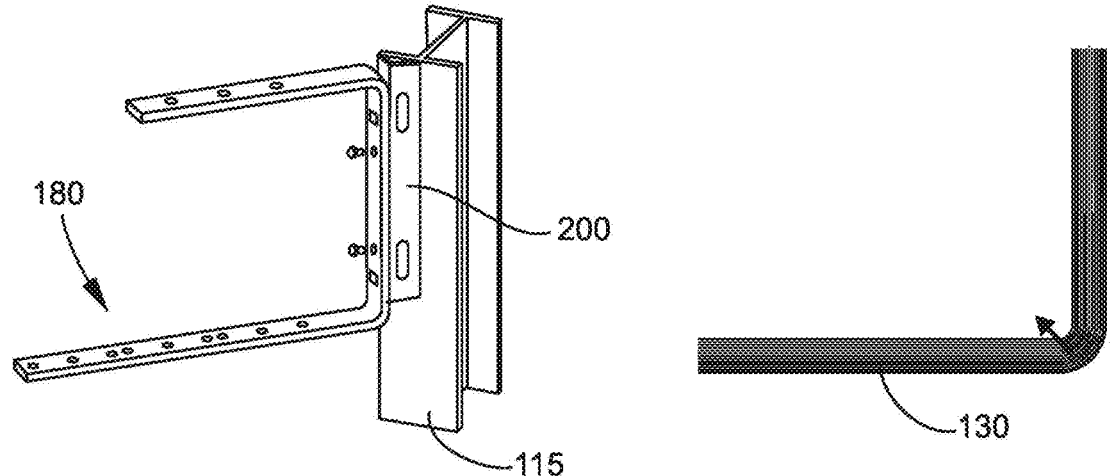
FIG. 11A                    FIG. 11B

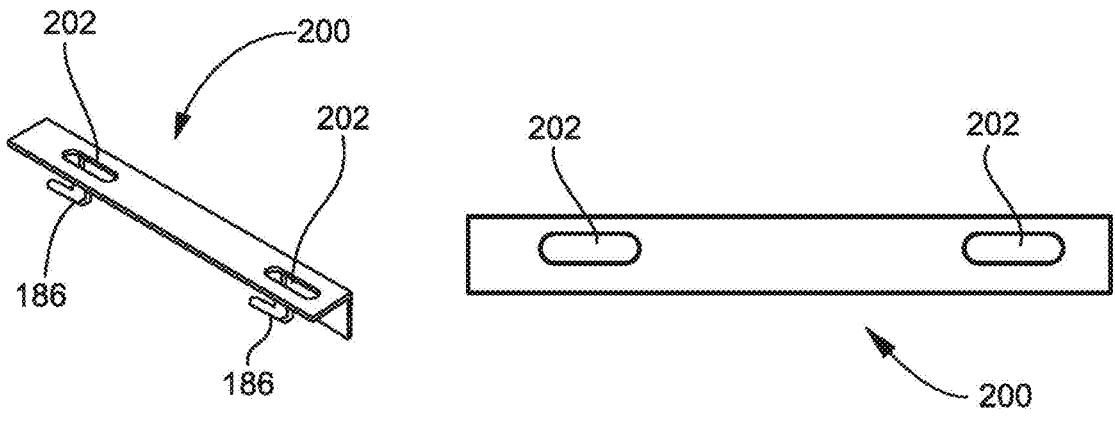
FIG. 12A                    FIG. 12B
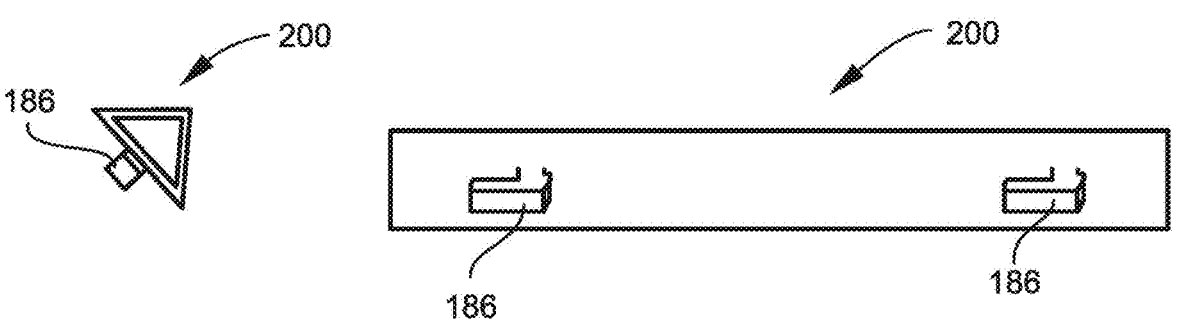
FIG. 12C                    FIG. 12D

131

210

210

SELF SUPPORTING SOLAR SOLUTION

PRIOR APPLICATIONS

The present application is a continuation of U.S. Utility patent application Ser. No. 19/295,119 filed on Aug. 8, 2025 which is a continuation of U.S. Utility patent application Ser. No. 19/040,207 filed on Jan. 29, 2025, now U.S. Pat. No. 12,418,260, which is a continuation of U.S. Utility application Ser. No. 18/989,980 filed Dec. 20, 2024, which claims priority to and benefit of U.S. Provisional Patent Application No. 63/613,885 filed Dec. 22, 2023 and U.S. Provisional Patent Application No. 63/680,776 filed Aug. 8, 2024, all of which are hereby expressly incorporated by reference.

TECHNICAL FIELD AND BACKGROUND

The present invention relates generally to electrical bus systems, and more particularly, to an electrical bus system that interconnects arrays of solar power generation units.

Conventional solar power generation systems feed the output current from numerous solar panel arrays to combiner boxes. Electrical buses carry the current from combiner boxes to a centralized power system and in some cases, carry current from the solar panel arrays to the combiner boxes. There is a desire in the industry to lower cost and increase efficiency by using less components, such as fewer photovoltaic wires and connectors, which in turn requires the components that are used to carry higher current amperage.

One disadvantage of increasing current is that combiner boxes are prone to overheating and failure even from relatively small losses at the numerous connection points and the accompanying high currents, and combiner boxes are difficult to safely service and replace. Conventional electrical bus lines connecting the combiner boxes also suffer from disadvantages that include high material costs and significant labor required to install the bus systems. Electrical bus systems are generally buried in trenches, which require heavy machinery to dig and prepare the ground to receive the bus systems, or they are hung with hangers suspended above ground together with components that must be coupled to the electrical bus.

Given the drawbacks of conventional systems for electrically interconnecting solar panel arrays, it is an objective of the present invention to provide electrical bus systems that eliminate the need for combiner boxes and that are less expensive and more efficient to install. The bus disclosed in this application includes a self-supporting solution that provides mechanical support and that is used to couple the bus to vertical supports for installation without the need for hangers that are labor intensive to install and maintain. The bus is coupled to vertical supports using brackets that can be installed without hardware.

The individual trunk bus lines run through separate cable throughways formed in clamping blocks that separate the trunk bus lines to promote cooling. The clamping blocks attach to the brackets that are coupled to the vertical supports.

The positive and negative bus lines can be formed from a ruggedized cable construction suitable for both low voltage and high voltage applications. The ruggedized cables can include an aluminum coated inner steel member to add rigidity and strength to the bus lines. The bus line is coupled to string photovoltaic wires coming from the solar panel arrays using a multi-tap shear bolt connector that eliminate the need for combiner boxes and that show favorable temperature performance compared to combiner boxes.

SUMMARY

In one embodiment of the electrical bus system, a plurality of vertical supports are arranged in a row where each vertical support is proximal to at least one power generation unit, such as one or more solar panel arrays. A trunk bus extends between the vertical supports. The trunk bus has a positive bus line, a negative bus line, and an aluminum coated steel core member running through the interior of the positive bus line and the negative bus line. A bracket is fixed to each of the vertical supports without the use of hardware. The trunk bus is secured to the bracket at each vertical support by running the trunk bus lines through a clamping block coupled to the bracket.

In one embodiment, the bracket has a head, a neck, a flattened body, and one or more openings. The head and the neck extend through a slot in the vertical support and the clamping block is secured to the body of the bracket. In another embodiment, the bracket is an "L-shape" with a body, a free end and a coupling end, a rabbeted portion extending from the coupling end, and a stem extending from the rabbeted portion. The stem extends through the slot in the vertical support. In another embodiment, the bracket is a "C-shape" with a vertical coupling portion, a first end, a second end, and a front and rear surface. A first portion extends perpendicular from the front surface of the vertical coupling portion first end. A second portion extends perpendicular from the front surface of the vertical coupling portion second end. An interlocking hook is disposed on the vertical coupling portion's rear surface. The interlocking hook extends through the slot in the vertical support.

In another embodiment, the bracket is coupled to a corner turn assembly. The corner turn assembly has a first sidewall, a second sidewall coupled to the first sidewall, and a rear sidewall coupled to both the first sidewall and the second sidewall. Interlocking hooks are affixed to the exterior surface of the rear sidewall. The interlocking hooks extend through the slot in the vertical support. A first vertically aligned corner assembly slot is on the exterior surface of the first sidewall. The corner assembly slots accept the interlocking hooks of the bracket to connect the bracket to the corner turn assembly.

The system includes a clamping block coupled to the bracket. The clamping block has a plurality of throughways that extend through the camping block from a first face to a second face. The positive bus line extends through a first throughway and the negative bus line extends through a second throughway.

The system also includes a multi-tap connector formed from a conductive material. The connector has a housing formed as an elongated hollow body with an exterior surface, a first opening, a second opening, and a socket extending from the first opening to the second opening. The trunk bus extends through the socket from the first opening to the second opening. The connecter also has a passage that extends from the exterior surface through the housing to the socket. A fastener, such as a shear bolt, is housed within the passage and frictionally engages the trunk bus within the socket.

The connector also includes a plurality of taps that are each formed as a conduit that extends through the connector housing to the socket. A conductor line, such as photovoltaic wires, is housed within each of the taps. The conductor line is electrically connected to the electrical power generation unit and the trunk bus. In another embodiment, the connector is at least partially encased within an insulating material that is molded thermoplastic elastomer disposed on the connector by heat shrinking.

In another embodiment, the clamping block include a first row of throughways above a second row of throughways linearly arranged along the length of the clamping block. The clamping block can be modular such that the first row of throughways is separable from the second row of throughways. The clamping block can also be made of an ultra-high molecular weight polyethylene.

The positive trunk bus line and the negative trunk bus line comprise a conductive cable that is partially covered by a first insulating layer made of cross-linked polyethylene material and a second insulating layer partially covering the first insulating layer made of a high-density polyethylene material. The first insulating layer is non-colored and has a thickness between 5 mils to 15 mils and the second insulating layer has a thickness between 20 mils to 30 mils.

BRIEF DESCRIPTION OF THE FIGURES

Features, aspects, and advantages of the present invention are better understood when the following detailed description of the invention is read with reference to the accompanying figures, in which:

FIG. 11A depicts a mounted corner turn assembly and C-bracket.

FIG. 11B illustrates the function of a corner turn assembly.

FIG. 12A illustrates a perspective view of a corner turn assembly.

FIG. 12B illustrates a side view of a corner turn assembly.

FIG. 12C illustrates an end view of a corner turn assembly.

FIG. 12D illustrates a rear view of a corner turn assembly.

DETAILED DESCRIPTION

Figure 1:
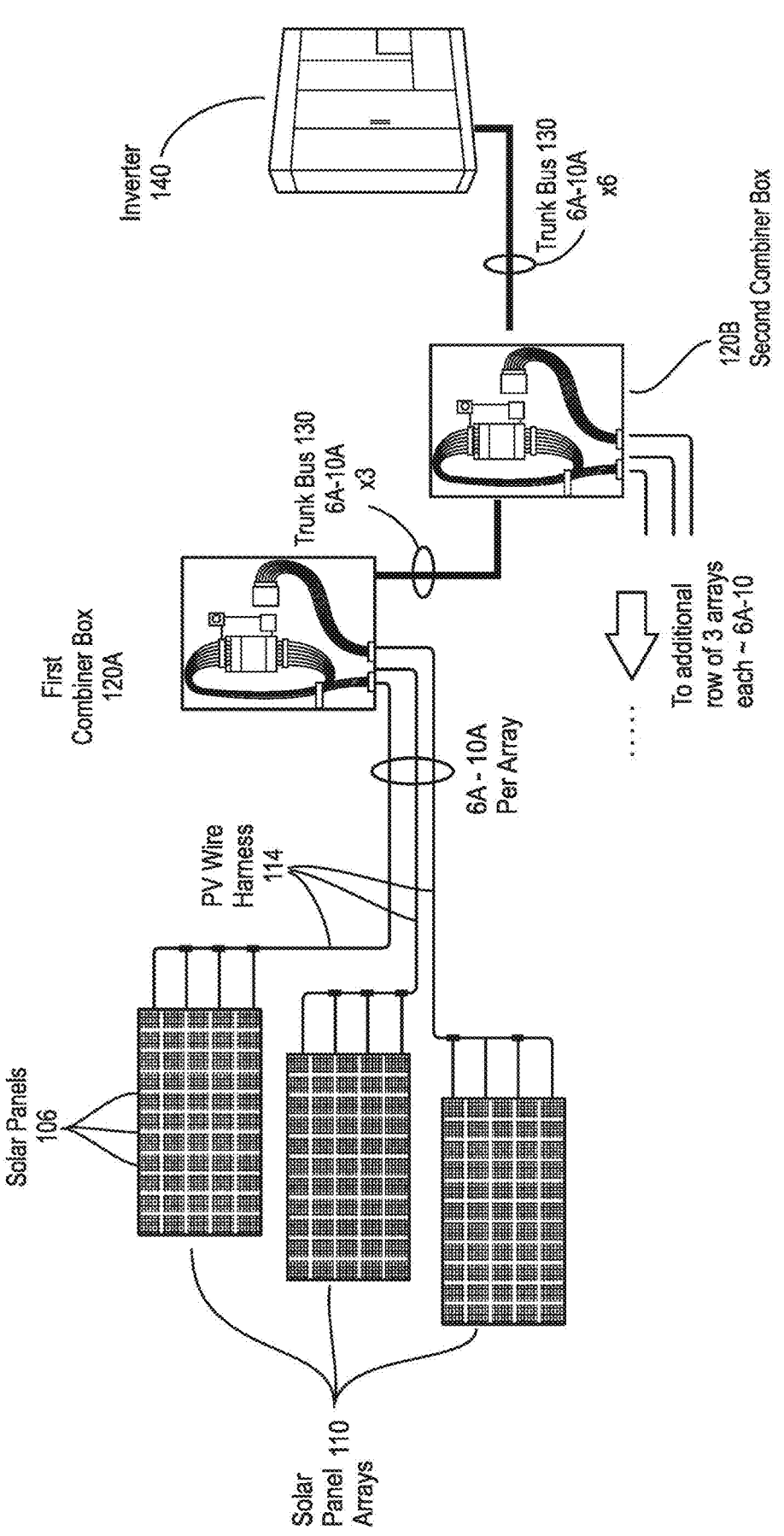
FIG. 1 illustrates a conventional configuration for interconnecting solar panel arrays.

The present invention will now be described more fully hereinafter with reference to the accompanying pictures in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

Solar Panel Array Bus Systems

Figure 2:
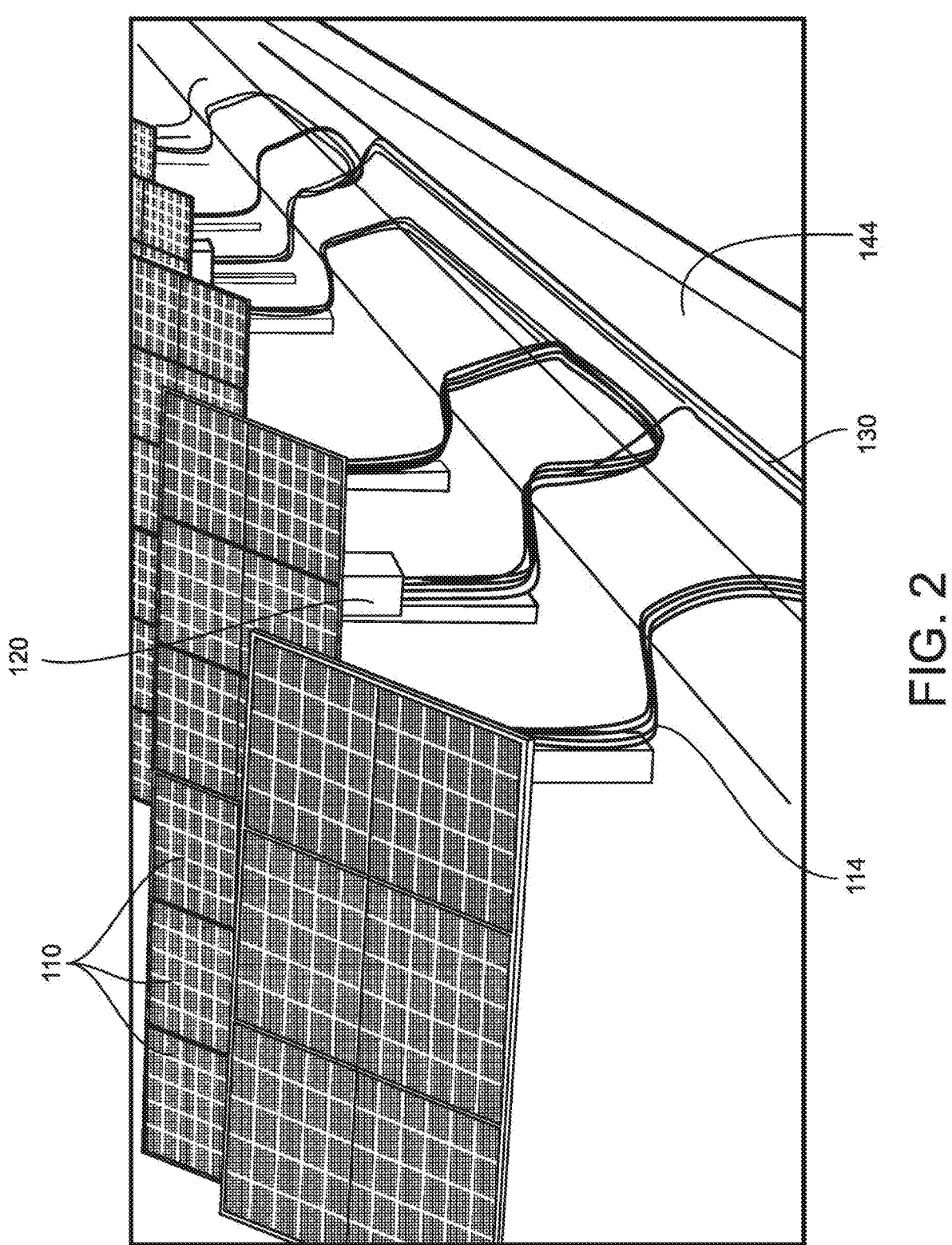
FIG. 2 illustrates trunk bus installation through trenching techniques.

Examples of conventional configurations for electrically interconnecting solar panel arrays are illustrated in FIGS. 1-3. The individual solar panels 106 are arranged into panel arrays 110. Each solar panel array 110 outputs approximately 6 A to 10 A of current through a photovoltaic ("PV") wire harness 114 that leads to a combiner box 120A & 120B. The current from each panel array 110 is combined within the combiner box 120A & 120B and fed to a trunk bus 130. The trunk bus 130 carries the combined current to an inverter 140 that connects to a disconnect box and to a local power grid.

Note that the example configurations shown in FIGS. 1-3 are illustrative and not intended to be limiting, and there are other potential configurations that can be improved using the inventive systems, components, and methods described in this specification. For instance, FIG. 1 shows three panel arrays 110 and corresponding PV wire harnesses 114 feeding combiner boxes 120A & 120B, but in some configuration there could be ten, twenty, or another predetermined number of solar panel arrays 110 connected to a combiner box 120A & 120B. Moreover, the PV wire harnesses 114 could be connected to an initial feeder bus that extends along a row of panels arrays 110. The feeder bus then connects the panel arrays 110 to the combiner boxes 120A & 120B and trunk bus 130, which is also known as a "home run" to the power station including the inverter 140. In those cases, both the trunk bus 130 and the initial feeder bus could be improved with the self-supporting bus 130 disclosed herein or the use of multi-tap connectors disclosed herein.

The trunk bus 130 includes one or more conductor lines in combination with other lines that run in parallel and provide mechanical support and grounding protection. The trunk bus 130 can include a positive trunk bus line 134 and a negative trunk bus line 136 made from available photovoltaic cable. The positive trunk bus line 134 and negative trunk bus line 136 can be formed as electrically conductive stranded cables surrounded by one or more insulating layers. For higher amperage applications, the positive and negative trunk bus lines 134 & 136 are formed as bus bars.

The positive and negative trunk bus lines 134 & 136 are optionally housed within the same or within separate conduits (i.e., a hollow plastic or metal tube that houses the bus lines) for mechanical stability and protection against weather elements. The trunk bus 130 can also include a ground cable 132 (also known as a bonding cable). Additionally, the trunk bus 130 can be formed with a grounding line that electrically connects to each of the combiner boxes to protect against instances where a grounded combiner box becomes inadvertently energized.

With reference to FIG. 1, multiple combiner boxes 120A & 120B may be connected in series along the trunk bus 130 such that the current becomes increasing larger across each combiner box 120A & 120B nearing the inverter 140. To illustrate with reference to the simplified example configuration shown in FIG. 1, the first combiner box 120A accepts input from three solar panel arrays 110 that each have a current output of 6 A-10 A. Assuming for the sake of illustration that each panel array 110 has an output of 10 A at 600 volts direct current ("VDC"). The output of the first combiner box 120A to the trunk bus 130 is then 30 A at 600 VDC. If a second row of three panel arrays (not shown) is connected to the second combiner box 120B, then the output at the second combiner box 120B is 60 A at 600 VDC. Thus, the current and power output, which is proportional to current (i.e., Power=Current×Voltage), are both doubled at the output of the second combiner box 120B.

The increasing current at the output of each combiner box leads to combiner box overheating and failure and limits the number of solar panel arrays that can be connected along a trunk bus 130. Combiner boxes are difficult to service safely because of the larger currents handled, and connection points within the combiner boxes must be torqued and otherwise installed precisely to avoid current loss that leads to overheating. Moreover, the increasing current requires larger conductor sizes for the trunk bus 130 that can become challenging and costly to install. FIG. 2 depict a conventional trenching technique for installing a trunk bus.

As illustrated in FIG. 2, trenching techniques entail burying the trunk bus 130 within a trench 144 created proximal to rows of solar panel arrays 110. Disadvantages of trenching techniques include the need for heavy equipment to form the trench 144 and the difficulty of repairing or servicing the trunk bus 130 after it has been buried.

Self-Supporting Bus Systems

Figures 3A, 3B:
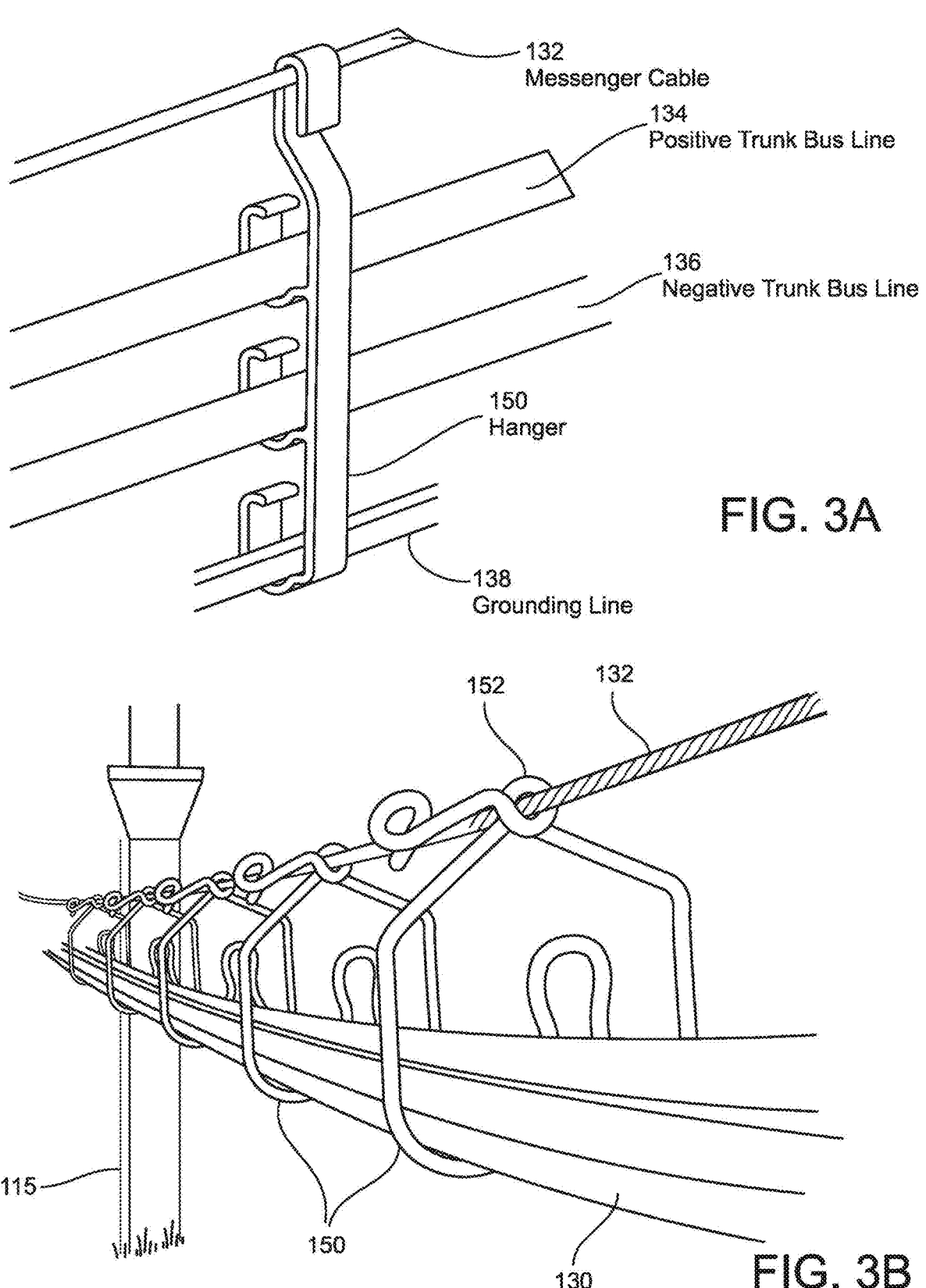
FIG. 3A illustrates a conventional configuration for supporting a trunk bus using hangers.
FIG. 3B illustrates a conventional configuration for supporting a trunk bus using hangers.

Above-ground bus systems offer advantages that include the ability to access the trunk bus 130 for servicing and repair. A conventional above-ground system is shown in FIGS. 3A-3B that relies on thousands of hangers 150 to support the trunk bus 130 from a ground or bonding cable 132. The hangers 150 add significant weight and cost to the system and must be installed in close proximity to one another (e.g., every 18 inches) to support the substantial lengths and weights of trunk buses 130. A 500 MW solar field could require between 500,000 to 750,000 hangers that must be manufactured and installed at a substantial cost of time and money.

Installing the hangers requires running the various trunk bus 130 lines through each individual hanger 150, and in some cases, each hanger 150 must be bent or twisted to create a closed loop 152, such as the example hangers shown in FIG. 3B. Given the substantial number of hangers 150 required and the significant labor involved with installing each hanger, the use of hanger installation techniques can involve substantial material and labor costs as well as installation time that can be avoided using the present self-supporting bus solutions.

The present self-supporting bus solutions eliminate the material costs and labor required to install hanger systems by coupling the trunk bus 130 lines to vertical supports 115, as shown in the attached Figures. The trunk bus 130 is coupled to a vertical support 115 using brackets (117, 160, 170, 180) or other suitable coupling means that include, without limitation, hooks, turnbuckle tensioners, wire clamps, wire claps, or fasteners driven through the trunk bus 130. In addition to substantial savings of installation time, labor costs, and material costs, eliminating the need for hangers has the benefit of permitting the ground cable 132 to be a pure electric ground without the need for tension to support the trunk bus 130. The system does not, therefore, require independent dead ends or anchor points at corners or points where the trunk bus changes direction, which further reduces installation time and cost given there is no longer a need to set up the anchor points. The self-supporting solution allows for seamless installation of a single ground cable 132 from the furthest point in a solar field.

Figure 4:
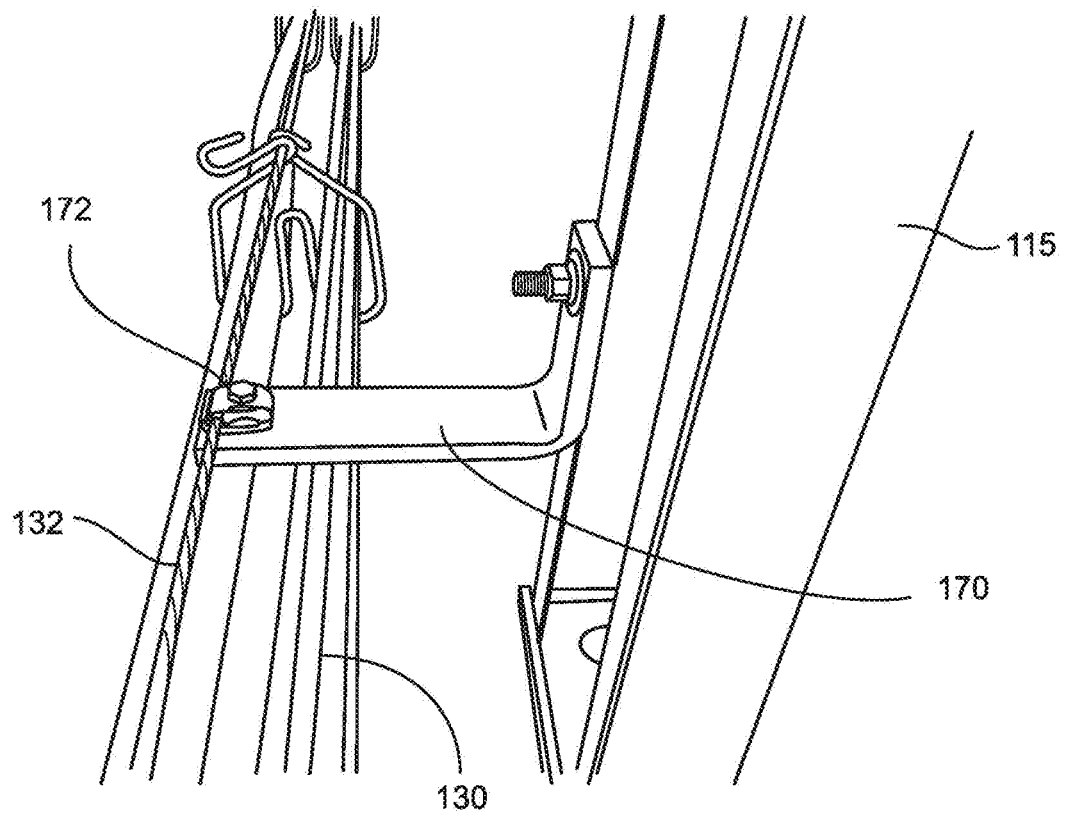
FIG. 4 depicts installation of a trunk bus using a bracket according to one embodiment of the disclosed bus system.
Figure 5:
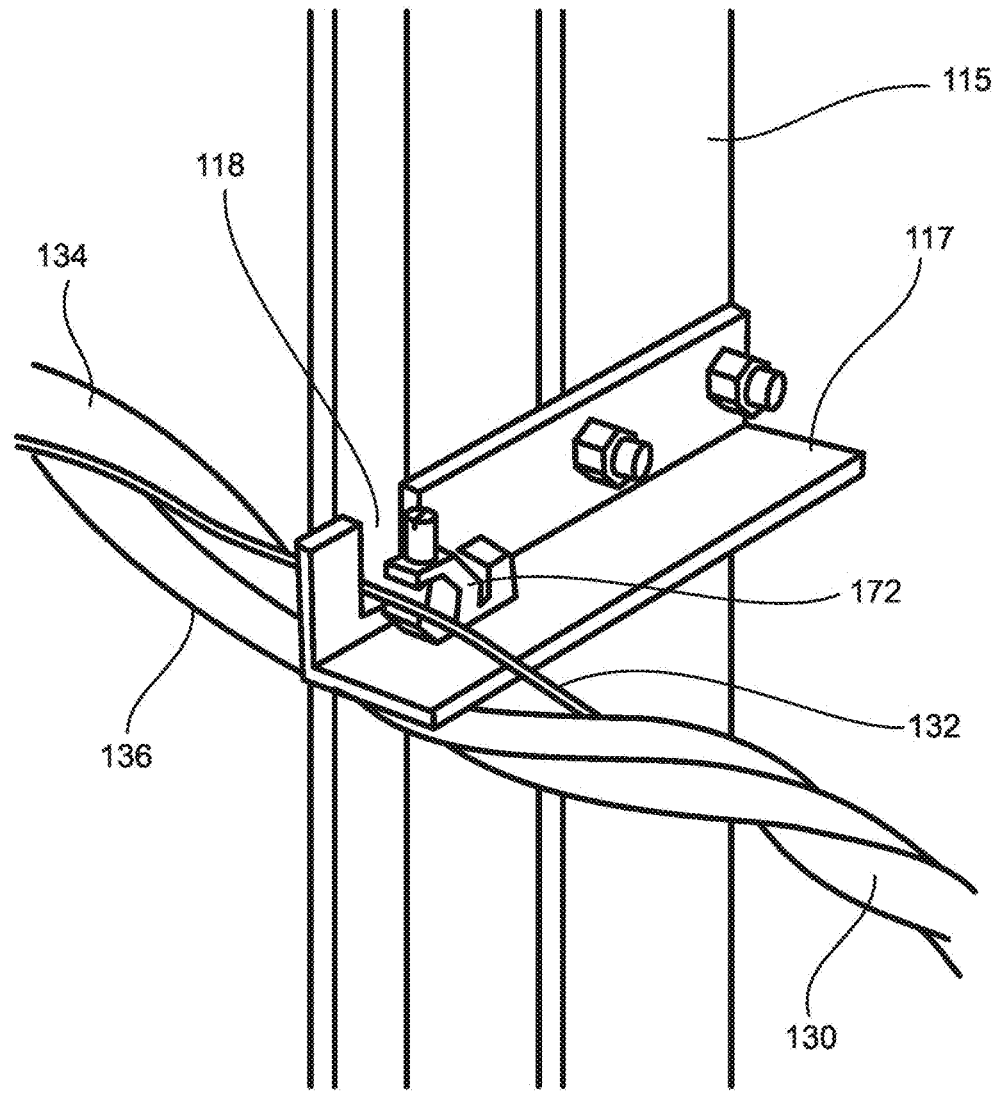
FIG. 5 depicts installation of a trunk bus using a bracket according to one embodiment of the disclosed bus system.

Conventional brackets, such as the elbow bracket shown in FIG. 4, must be installed on a vertical support 115 using hardware that includes nuts, bolts, and washers, and the bracket utilizes a copper lug that accommodates the ground cable 132. The trunk bus 130 is installed by seating the ground cable 132 within the clip 172 so that the ground cable 132 supports the weight of the trunk bus 130. In another embodiment, the example bracket 117 shown in FIG. 5 includes a notch 118 that accommodates the ground cable 132. The trunk bus 130 is installed by seating the ground cable 132 within the notch 118 so that the ground cable 132 supports the weight of the trunk bus 130.

In one example embodiment, the brackets (117, 160, 170, 180) are mounted to a vertical support 115 installed at each row of solar panels, or installed at a distance of every 18 to 25 feet apart, while still being able to accommodate the length and weight of the trunk bus 130. In other embodiments, the brackets (117, 160, 170, 180) are replaced with grounding clamps that securely couple the trunk bus 130 to vertical supports 115.

Figure 6A:
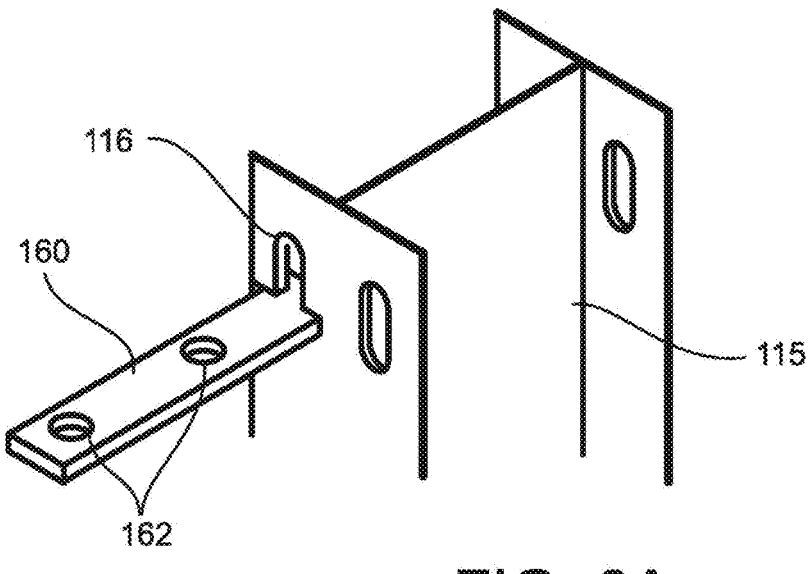
FIGS. 6A and 6B depict installation of a trunk bus using a bracket according to one embodiment of the disclosed bus system.
Figure 6B:
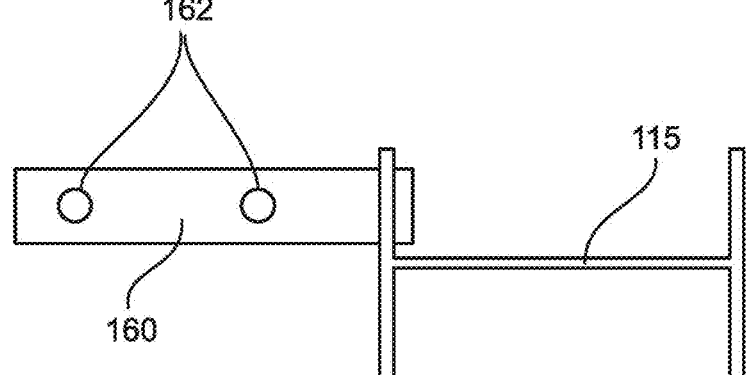
Figure 6C:
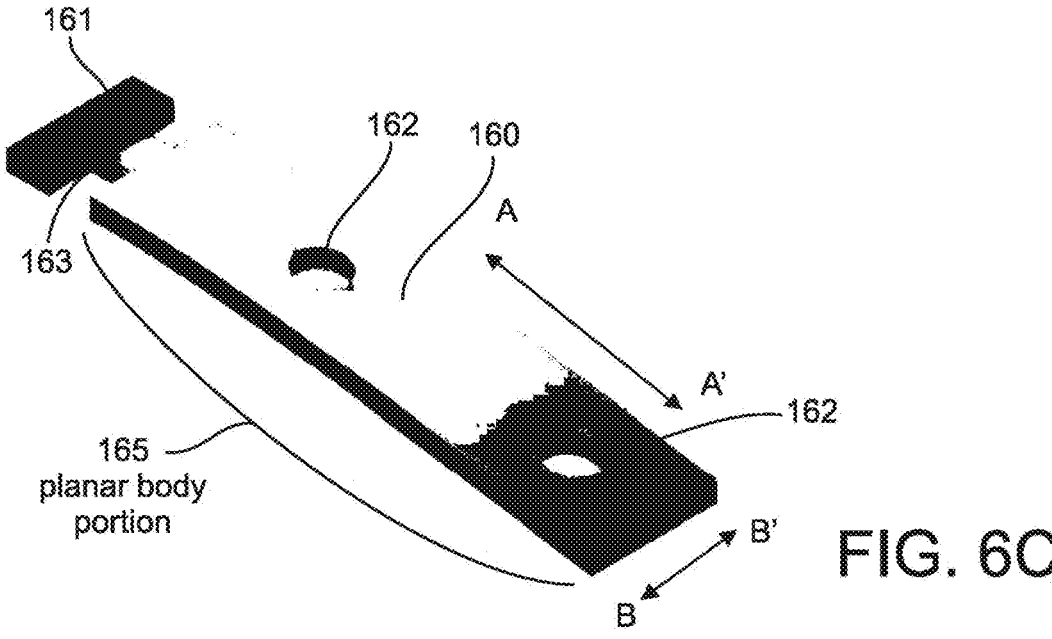
FIG. 6C depicts a bracket according to one embodiment of the system.

One embodiment of the bracket 160 depicted in FIGS. 6A-6C includes a head 161 portion, a neck 163 portion, and a planar body portion 165 with apertures 162 disposed in the body portion 165. The body 165 is elongated with a top surface and a bottom surface such that the apertures 162 extend through the body from the top to the bottom surface. The body 165 has a first axis (A to A') extending from the head 161 along the length of the elongated body 165 and a second axis (B to B') extending across the width of the body 165.

In some embodiments, the width of the bracket (B to B') can vary across the length of the body 165 (A to A'). For instance, the body 165 can be formed with a larger width near the head 161 and neck 163 to provide additional rigidity and strength. The portion of the bracket 160 near the head 161 is secured to the vertical support 115 and becomes load bearing when a trunk bus 130 is fixed to the bracket 160, and the additional width mitigates against bracket failure and lateral movement across the B-B' direction.

To install the bracket 160 to a vertical support 115, the bracket is rotated about the first axis such that the apertures are perpendicular to the ground. As illustrated in FIGS. 6A-6B, the head 161 and neck 163 are inserted through a vertically aligned slot 116 in the vertical support 115, and the bracket 160 is rotated ninety degrees to lock the bracket 160 into place. The trunk bus 130 is secured to the planar body 165 portion using a lug or a fastener, such as a bolt or screw, that is inserted through the aperture 162 and tightened to clamp down on the trunk bus 130. In particular, the ground cable 132 can be placed across the top of the body portion 165 within a clip, such as the clip 172 shown in FIGS. 8A-8B, and the clip 172 can be clamped with a fastener to hold the ground cable 132 and the remainder of the trunk bus 130 in place.

Figure 7:
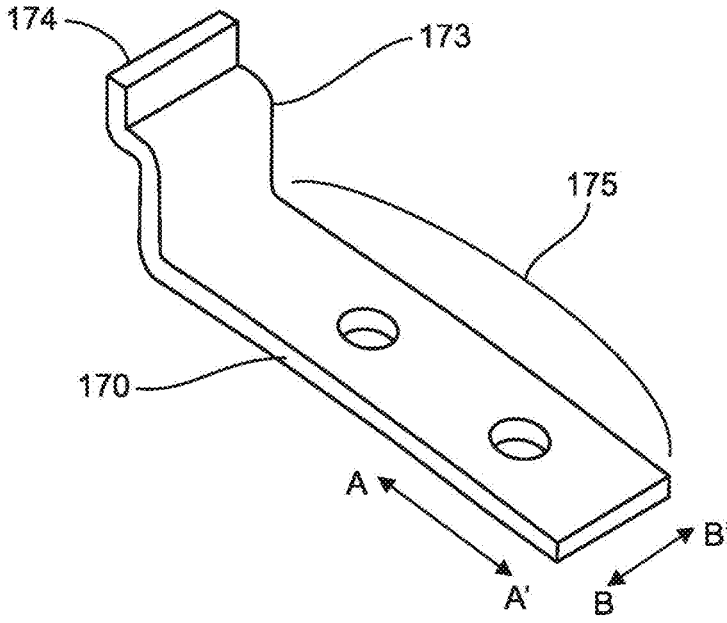
FIG. 7 depicts a bracket according to one embodiment of the system.

In another embodiment shown in FIG. 7, the bracket 170 is formed in approximately an "L-shape" with a planar body 175, apertures disposed in the body 175, a rabbeted portion 173, and a stem 174. To secure the bracket 170 to a vertical support 115, the body 175 is angled upward, the stem 174 is inserted through a vertically aligned slot in the vertical support 115 until the rabbeted portion 173 meets the slot edges, and the bracket 170 is rotated downward such that the body 175 is approximately parallel to the ground. The trunk bus 130 is fixed to the body 170 using threaded fasteners and/or a clip, such as the clip 172 and fastener shown in FIGS. 4 and 8A-8B. In another embodiment, the bracket 170 is secured to the vertical support 115 using a fastener, such as screw or bolt, as depicted in FIG. 4.

Figure 8A:
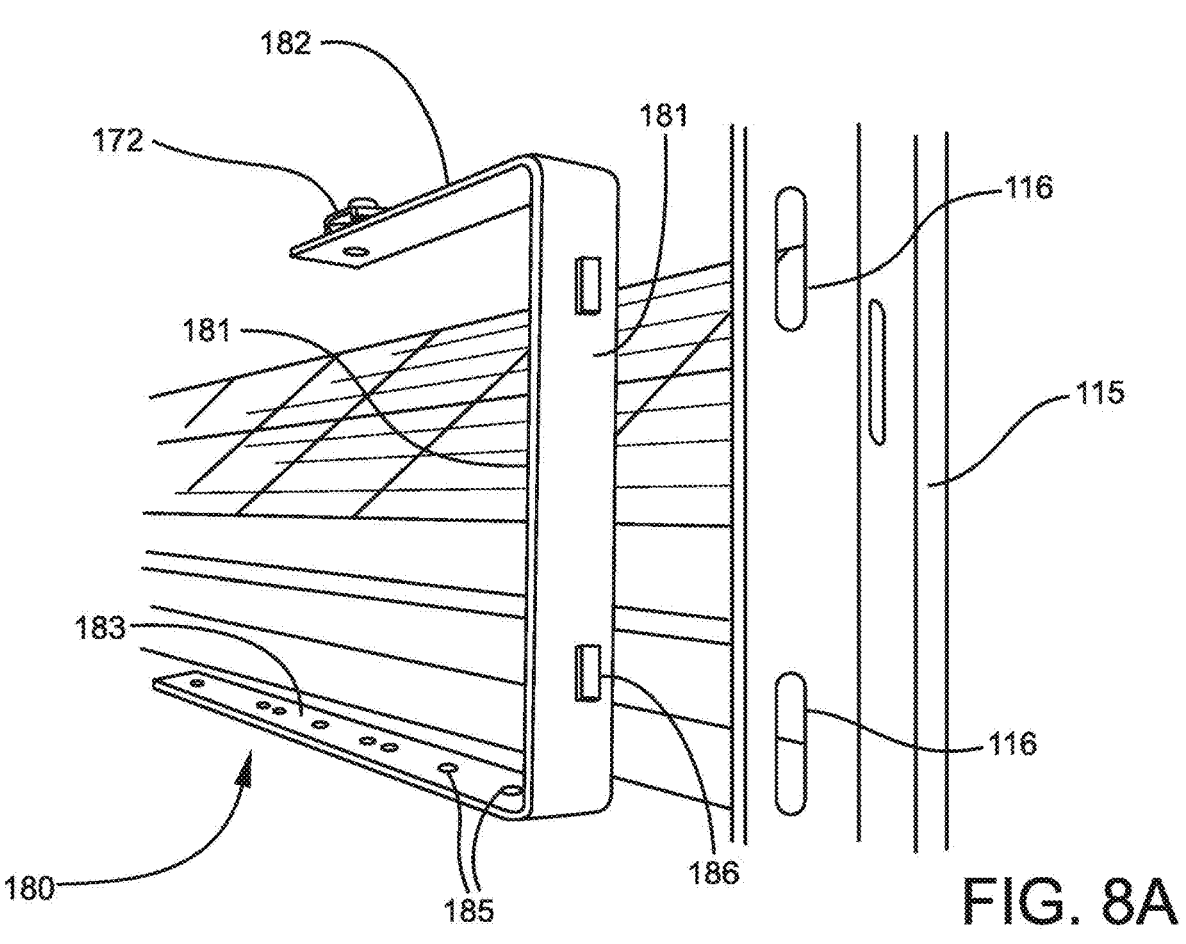
FIG. 8A is a perspective side view of a trunk bus bracket according to one embodiment of the system.
Figure 8B:
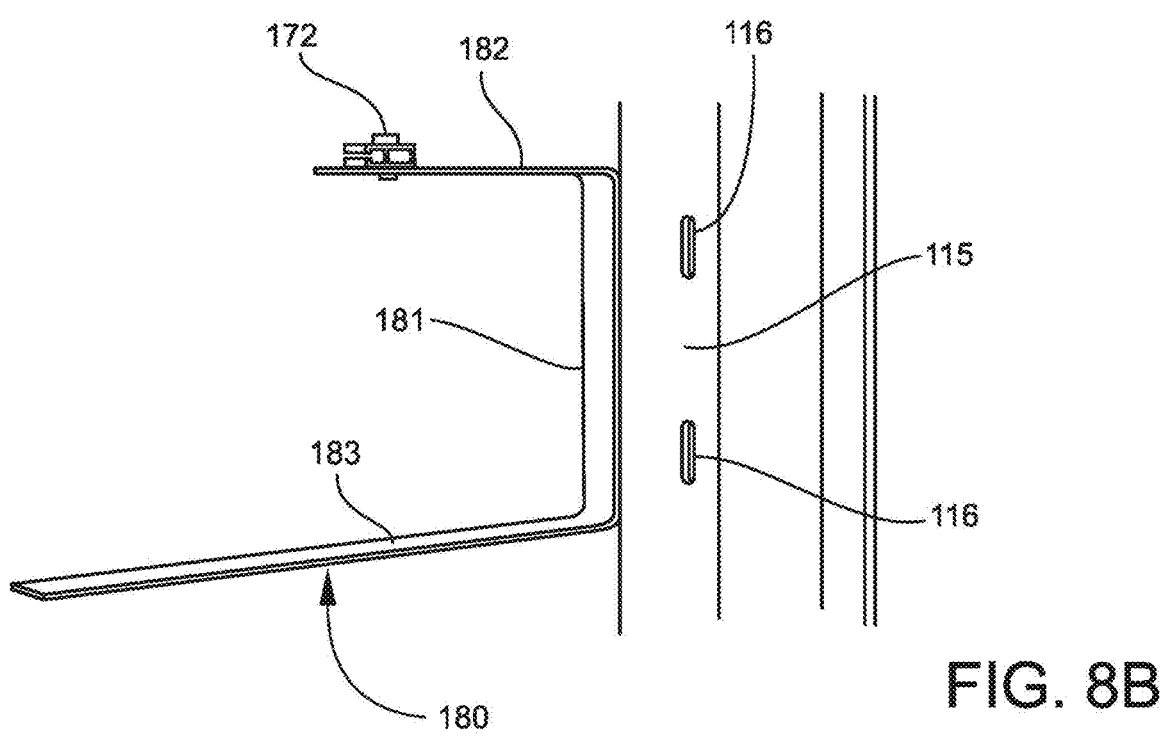
FIG. 8B is a perspective side view of a trunk bus bracket according to one embodiment of the system.

Another embodiment uses the C-shaped bracket 180 shown in FIGS. 8A-8B. The C-bracket 180 shown in FIGS. 8A-8B includes: (i) a first portion 182, also referred to herein as a ground cable support portion, extending perpendicular from the front surface of the vertical coupling portion first end that is used to support a ground cable or boding cable between spans of vertical supports 115 (ii) a clip 172 disposed on the ground cable; (iii) a second portion 183, also referred to herein as a trunk bus support portion, extending perpendicular from the front surface of the vertical coupling porting first end that is used to secure the clamping blocks 190 and truck bus 130; (iv) one or more clamping block coupling apertures 185 that accommodate fasteners that hold the clamping blocks 190 in place; (v) a third portion 181, or vertical coupling portion, with a first end, a second end, a front surface and a rear surface, that couples to the vertical supports 115; and (iv) interlocking hooks 186 disposed on the vertical coupling portion rear surface that extends through the vertically aligned slot 116 in the vertical support 115.

Figure 9:
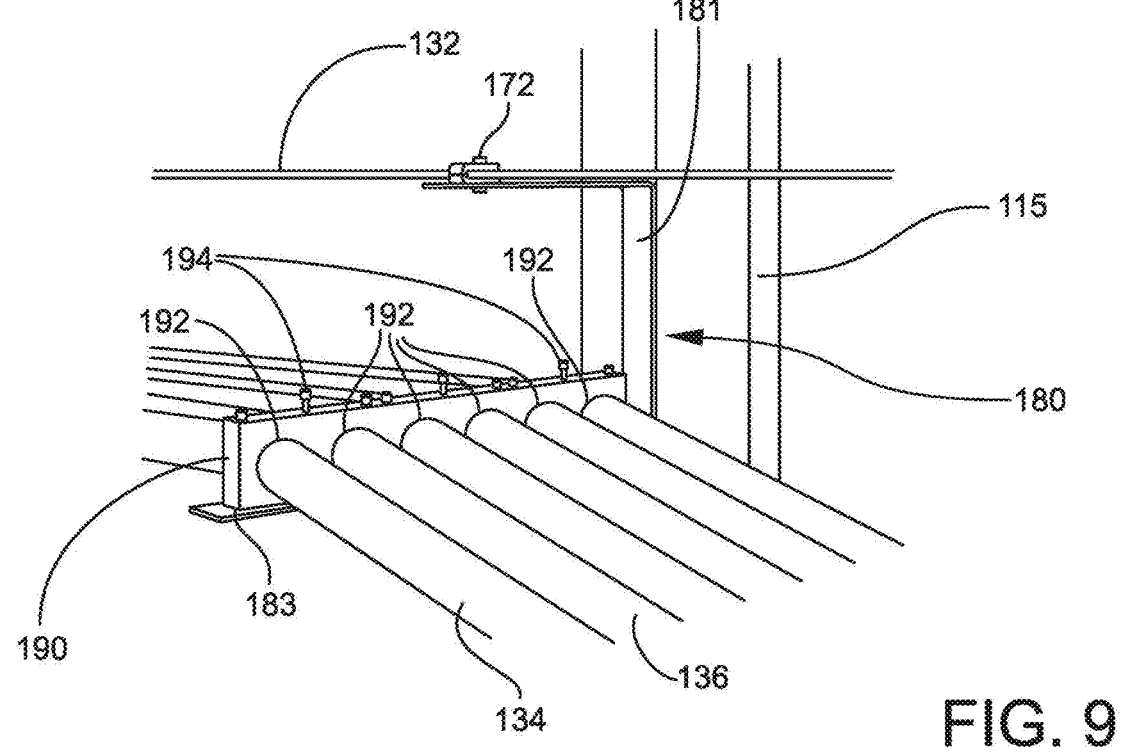
FIG. 9 depicts a trunk bus, a bracket, and a clamping block according to an embodiment of the system.

The C-shaped bracket 180 is secured to the vertical supports 115 by inserting the interlocking hooks 186 into the vertically aligned slots formed in the vertical supports 115. Given the relatively small width of the bracket 180, the bracket 180 can be coupled to the web or flange section of a vertical support 115. The ground cable 132 is coupled to the first portion 182 using the clip 172, as shown in FIG. 9. The trunk bus support portion 183 is coupled to clamping blocks 190 using fasteners 194 that extend through clamping block coupling apertures 185. The C-bracket 180 can also include mechanical screws that pierce the insulation of the trunk bus lines 130 to hold the trunk bus lines in place.

The clamping blocks 190 include one or more rows with varying numbers of cable throughways 192 in each row. The clamping block 109 has a length that goes along the row of cable throughways 192 and has a first face and a second face. The cable throughways 192 extend through the camping block 190 from the first face to the second face. In this way, each row is linearly arranged along the length of the clamping block 190. The clamping block shown in FIGS. 9 and 10 include six cable throughways 192 in each row, but more or less cable throughways 192 can be used in each row. The clamping blocks 190 are modular such that one or more rows of throughways 192 can be stacked on top of one another to accommodate more trunk bus 130 lines, such as the clamping block 190 shown in FIG. 10. The rows of throughways 192 can be secured together with dowels, pegs, detents, bolts or other fasteners that extend through each row into the clamping block material.

The clamping blocks 190 provide spacing between trunk bus lines to promote heat dissipation. The clamping block 190 embodiment shown in the attached figures accommodates 20% more current without demonstrating increased temperature as compared to trunk bus lines that are integrated or bundled together in close proximity. Lower operating temperatures provides advantages that include mitigating against insulation material degradation and reduced shrink back at connection points. The cable clamping blocks 190 can be formed with an ultra-high molecular weight polyethylene with additives for enhanced ultraviolet light resistance, such as titanium oxide, carbon black, benzophenones, triazoles, organic nickel compounds, and hindered amine light stabilizers ("HALS").

Figure 10:
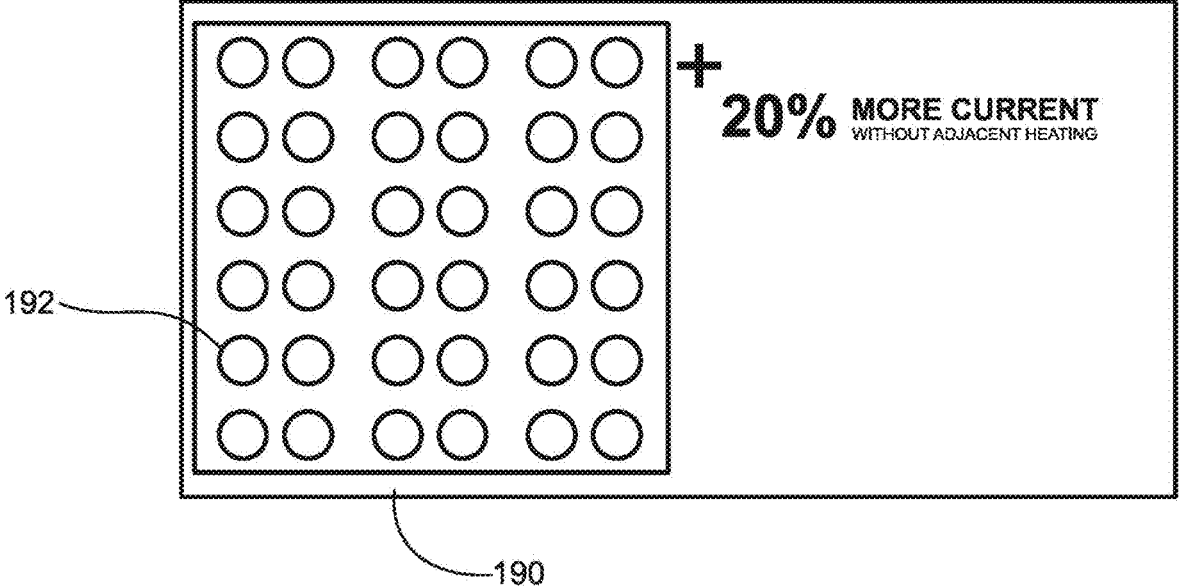
FIG. 10 depicts a modular clamping block.

The brackets (160, 170, 180) shown in FIGS. 6A-6C, 7, and 8A-8B can be made with galvanized high strength steel and have the advantage that the brackets (160, 170, 180) can be secured to the vertical support 115 without using threaded fasteners. Such installation is expedient and has no hardware cost, which provides substantial time savings and installation cost for systems where the brackets are installed a distance of every 18 to 25 feet. The brackets 160 & 170 can support up to four trunk bus lines 134 & 136. The bracket 180 combined with a stacked clamping block 190 can support up to 36 trunk bus lines, as illustrated in FIG. 10.

Eliminating hangers has the consequence that the ground cable 132 does not need to be placed in tension to be load bearing to support the trunk bus 130. In conventional systems, the ground cable 132 is placed under tension by securing the ground cable 132 to anchor points, including where the trunk bus 130 changes direction, such as moving at a right angle. This also means that the ground cable 132 cannot be continuous but is broken into section that run between anchor points.

Without the need for anchor points, the present self-supporting solution can couple the brackets (160, 170, 180) to vertical supports 115 using a corner turn assembly 200 that permits the brackets to be mounted at an angle such that the brackets do not extend straight outward from the face of the vertical support 115. FIGS. 11A-11B illustrates use of a corner turn assembly 200 that is coupled to a C-bracket 180 to permit the trunk bus 130 to seamlessly extend around an approximately 90-degree angle. The ground cable 132 can therefore be formed as a single continuous line without the need to secure the ground cable 132 to anchor points under tension.

FIGS. 12A-12D depict different views of the corner turn assembly 200, which includes interlocking hooks 186 on a rear face of the assembly 200 where the hooks 186 fit into the vertically aligned slots formed in the vertical supports

115. The corner turn assembly 200 also includes vertically aligned corner assembly slots 202 formed in the angled faces of the assembly 200 where the slots 202 accept fasteners or interlocking hooks 186 to couple the brackets to the corner turn assembly 200.

Compared to traditional methods of trunk bus installation, the trunk bus 130 disclosed in this specification takes substantially less labor and time to install and results in substantial savings in material costs by removing the need for hangers 150 and a separate ground cable 132. More specifically, data gathered by Applicant to date shows that installation costs can be reduced by 25% to 50% using the trunk bus 130 construction and installation techniques. In addition to "home run" trunk busses that connect to a centralized power system, the trunk bus 130 and installation techniques disclosed herein can be applied to the construction of other types of electrical busses, including bus lines that connect individual panel arrays 110 or bus lines in other applications besides solar power generation.

Ruggedized SolarTough® Cable

The positive trunk bus line 134 and negative trunk bus line 136 can each be made with a SolarTough® ruggedized cable. The SolarTough ruggedized cable includes a conductive cable surrounded by an outer, first insulation layer and an inner, second insulation layer. The thickness of the insulation layers varies according to the size of the conductor cable that the insulation layers surround. Those of skill in the art will appreciate that the example embodiments described below are not intended to be limiting, and the SolarTough ruggedized cable can be constructed with materials and layer thicknesses that achieve comparable functionality and performance.

In one example embodiment, the first insulation layer can be made from cross-linked polyethylene ("XLPE"). The first insulation layer is itself surrounded by a second insulation layer of high-density polyethylene ("HDPE") that is also referred to as a "jacket." The SolarTough cable is generally used for applications with voltages between about 600V and about 2000V. The sizing of the SolarTough cable varies according to electrical capacity, as illustrated below in Table 1. Sizing is provided in KCMil or "kilo circular mils," which is a unit of area, equal to the area of a circle with a diameter of one mil (one-thousandth of an inch).

TABLE 1

| | | SolarTough Cable Sizing | | | |
|---|---|---|---|---|---|
| Size (AWG/ KCMIL) | # of Strands | Conductor Diameter (Mils) | Insulation Thickness (Mils) | Jacket Thickness (Mils) | Overall Diameter (Mils) |
| 8 | 7 | 132 | 73 | 13 | 304 |
| 6 | 7 | 166 | 73 | 13 | 338 |
| 4 | 7 | 209 | 73 | 13 | 381 |
| 2 | 7 | 264 | 73 | 13 | 436 |
| 1 | 19 | 300 | 90 | 16 | 512 |
| 1/0 | 19 | 362 | 90 | 16 | 574 |
| 2/0 | 19 | 410 | 90 | 16 | 622 |
| 3/0 | 19 | 457 | 90 | 16 | 669 |
| 4/0 | 19 | 496 | 90 | 16 | 708 |
| 250 | 37 | 543 | 102 | 18 | 783 |
| 300 | 37 | 569 | 102 | 18 | 809 |
| 350 | 37 | 620 | 102 | 18 | 860 |
| 400 | 37 | 657 | 102 | 18 | 897 |
| 500 | 36 | 744 | 102 | 18 | 984 |
| 600 | 61 | 812 | 115 | 20 | 1083 |

TABLE 1-continued

| | | SolarTough Cable Sizing | | | |
|---|---|---|---|---|---|
| Size (AWG/ KCMIL) | # of Strands | Conductor Diameter (Mils) | Insulation Thickness (Mils) | Jacket Thickness (Mils) | Overall Diameter (Mils) |
| 700 | 61 | 877 | 115 | 20 | 1148 |
| 750 | 60 | 917 | 115 | 20 | 1188 |
| 1000 | 60 | 1059 | 115 | 20 | 1330 |
| 1250 | 90 | 1196 | 132 | 23 | 1507 |

The electrical properties in turn vary according to cable sizing, as shown in Table 2.

TABLE 2

| | | SolarTough Cable Electrical Properties | | | |
|---|---|---|---|---|---|
| Size (AWG/ KCMIL) | Approx. Weight (lb/kft) | Resistance (Ω/kft 20° C.) | Resistance (Ω/kft 90° C.) | Ampacity 90° C. | Bend Radius (in) |
| 8 | 53 | 1.0504 | 1.3467 | 60 | 2.4 |
| 6 | 68 | 0.6610 | 0.8474 | 85 | 2.7 |
| 4 | 91 | 0.3300 | 0.4231 | 115 | 3.0 |
| 2 | 124 | 0.2610 | 0.3346 | 150 | 3.5 |
| 1 | 166 | 0.2070 | 0.2654 | 175 | 4.1 |
| 1/0 | 201 | 0.1640 | 0.2103 | 205 | 4.6 |
| 2/0 | 237 | 0.1300 | 0.1667 | 235 | 5.0 |
| 3/0 | 280 | 0.1030 | 0.1321 | 270 | 5.4 |
| 4/0 | 330 | 0.0810 | 0.1038 | 315 | 5.7 |
| 250 | 399 | 0.0694 | 0.0890 | 355 | 6.3 |
| 300 | 453 | 0.0578 | 0.0741 | 395 | 6.5 |
| 350 | 512 | 0.0495 | 0.0635 | 445 | 6.9 |
| 400 | 569 | 0.0434 | 0.0556 | 480 | 7.2 |
| 500 | 685 | 0.0347 | 0.0445 | 545 | 7.9 |
| 600 | 829 | 0.0289 | 0.0371 | 615 | 8.7 |
| 700 | 942 | 0.0248 | 0.0318 | 670 | 9.2 |
| 750 | 1000 | 0.0231 | 0.0296 | 700 | 9.5 |
| 1000 | 1275 | 0.0173 | 0.0222 | 845 | 10.6 |
| 1250 | 1611 | 0.0138 | 0.0177 | 965 | 12.1 |

The SolarTough cable is manufactured using a specially designed extrusion head that creates a curable product, which meets the UL specification 4703. The high-density polyethylene compound for the second insulation layer is extruded simultaneously over a pure cross-linked polyethylene material for the inner, second insulation layer. This creates a jacket where both layers are fully cross-linked resulting in significantly tougher jacket with superior surface abrasion resistance as well as color fastness in the outer layer.

The inner first insulation layer is black while the outer second insulation layer is colored to indicate, for example, whether the cable is a positive or negative bus line. The concentration of color particles in the outer layer delivers improved color fastness while protecting against degradation from UV light. The lack of color particles (particularly red) in the black, inner insulation layer means the phenomenon of porosity, which is normally seen with red color particles mixed throughout the insulation, is no longer created. This leads to longer life and more reliable insulation of the conductor. Those of skill in the art will appreciate that the example construction is not intended to be limiting, and other suitable thicknesses and insulators could be used that are capable of withstanding high-voltage applications.

Figure 13:
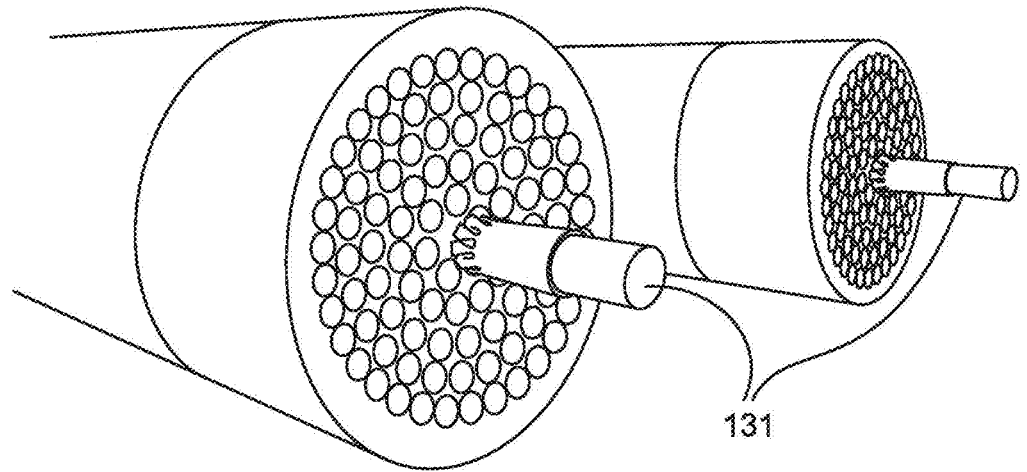
FIG. 13 depicts an aluminum coated, steel core member extending through a bus line.
Figure 14:
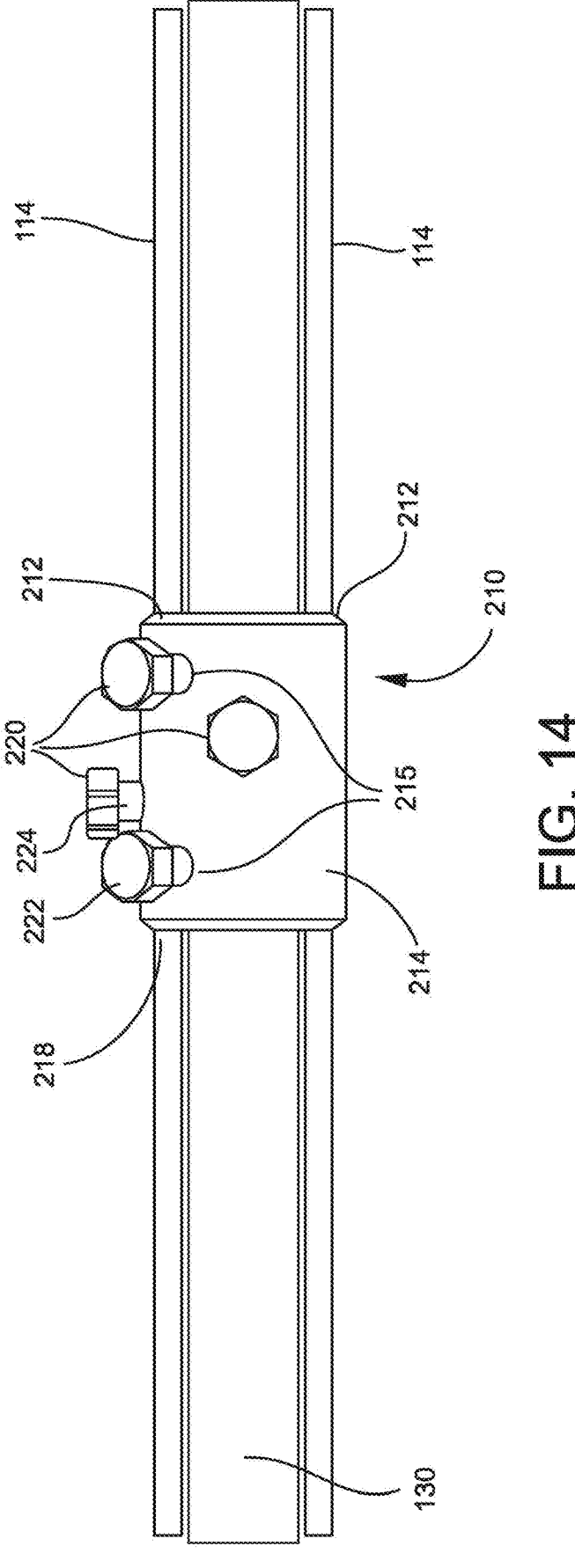
FIG. 14 is an example multi-tap connector according to one embodiment.
Figure 15:
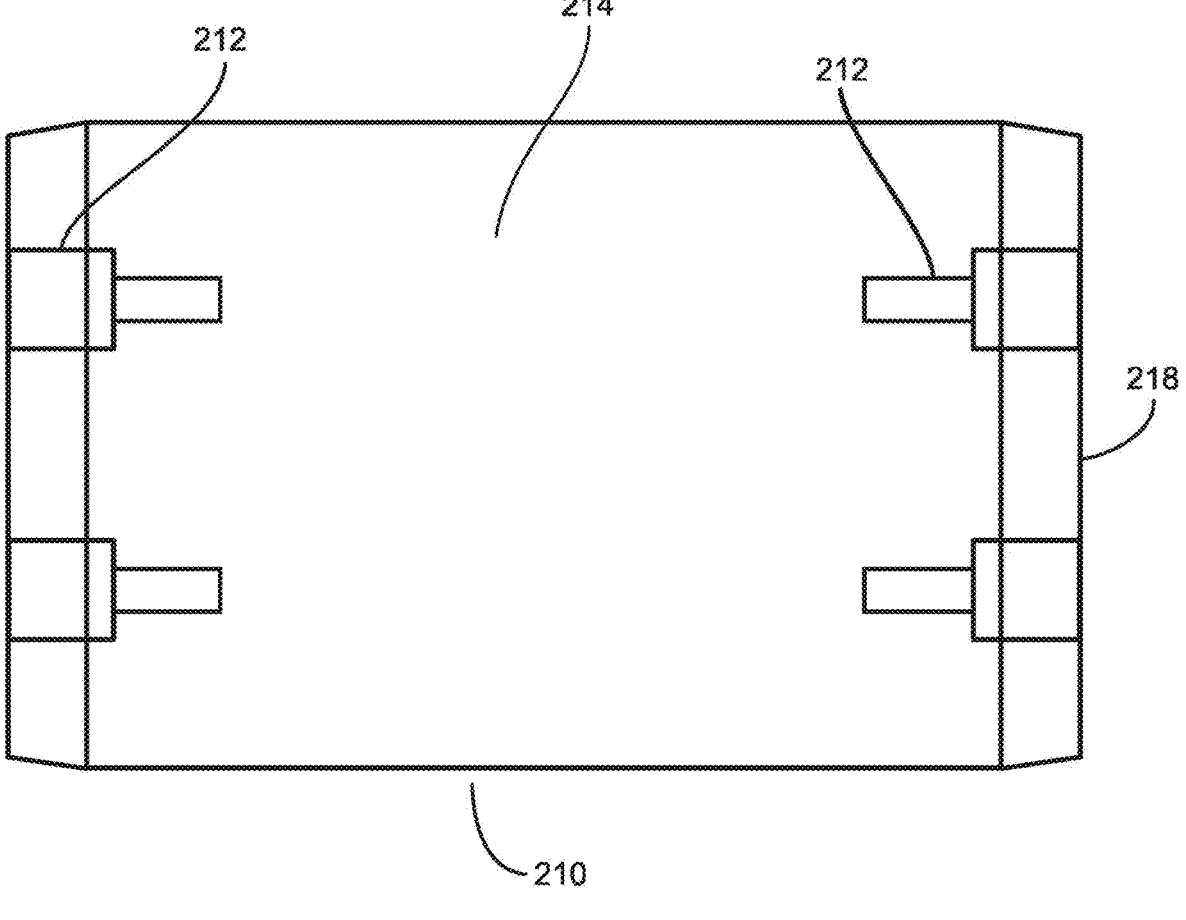
FIG. 15 is an example multi-tap connector according to one embodiment.
Figure 16:
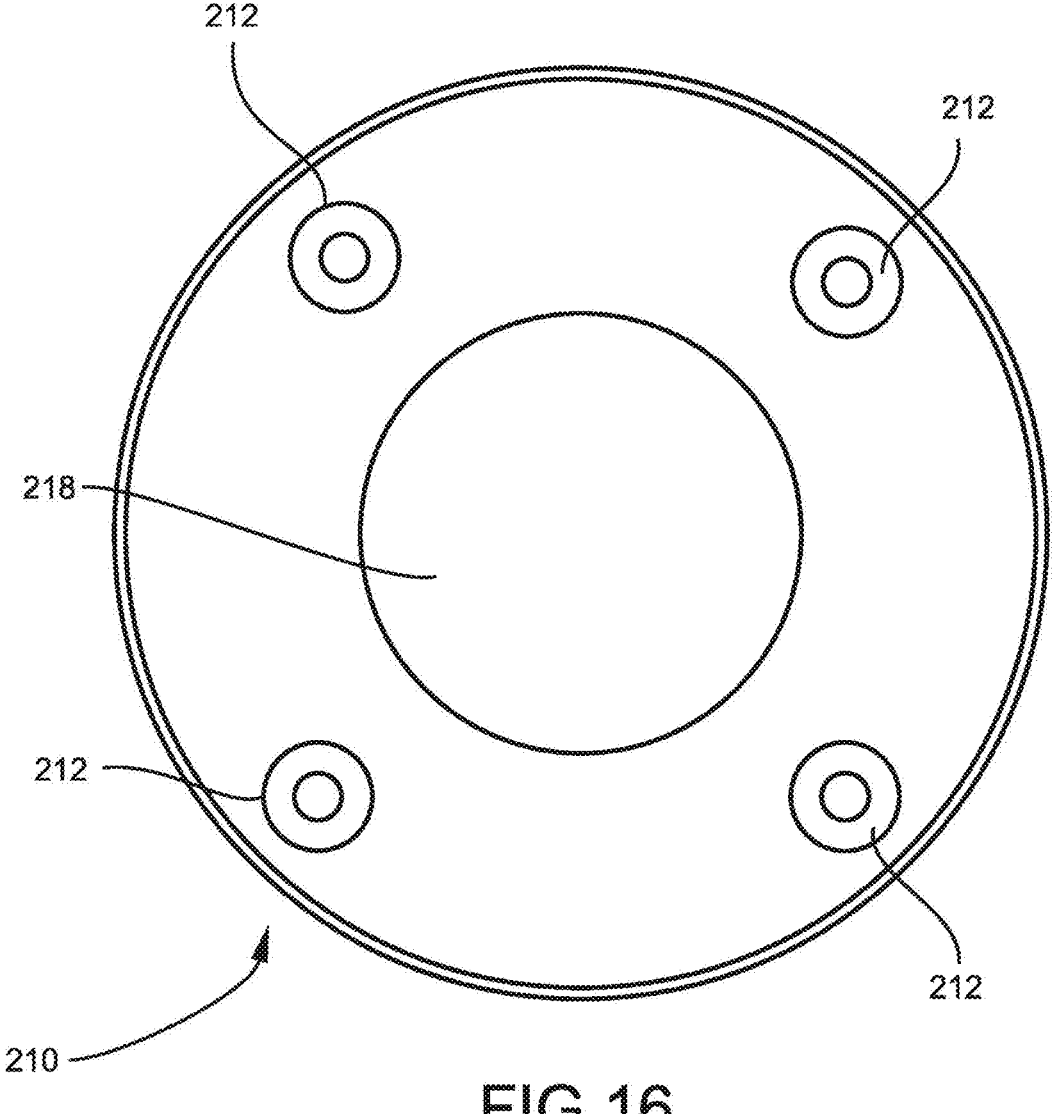
FIG. 16 is an example multi-tap connector according to one embodiment

In one embodiment, the SolarTough cable replaces some of the aluminum stranded conductors inside the cable with an aluminum coated, steel core member 131 shown in FIG. 13. The steel core member increases rigidity and strength of the bus line, which is particularly useful for applications where the bus line is suspended between vertical supports 115. The added strength from the steel core member 131 allows the bus line to be self-supported and span up to thirty feet between vertical supports 115 without the need for hangers that are used in conventional systems to support the trunk bus line from the ground cable 132.

Notably, steel is not as conductive as aluminum, which can result in a conductivity loss by replacing some of the aluminum stands in a cable with the steel core. Coating the steel core member with aluminum mitigates against the loss of conductivity and in part takes advantage of the "skin effect" where current tends to become concentrated near the exterior surface of a cable conductor strand with a circular cross section. Thus, coating the steel core member with aluminum places a higher conductivity material where the current tends to concentrate. Utilizing an aluminum coating can recapture about 70% of the current capacity that would have otherwise been lost when using a steel core member itself without the coating.

Multi-Tap Connector

Once the trunk bus 130 is installed, the solar panel arrays 110 can be connected to the trunk bus 130 using multi-tap penetrating connectors 210, such as the shear-bolt connectors shown in FIGS. 14, 15, 16, and 17A-17B. The connectors 210 are disposed about the trunk bus 130 lines and include a plurality of taps 212 for receiving portions of the PV wire harnesses 114. The multi-tap shear bolt connectors 210 show favorable temperature performance under high current conditions, and importantly, the connectors 210 obviate the need for combiner boxes that are prone to overheating and failure.

The connectors 210 include a hollow body portion (e.g., a housing 214) with one or more socket openings 218 defining the interior of the housing, or socket. The socket is a continuous channel extending through the entire length of the hollow body portion. The socket is configured to accommodate and firmly secure a conductor (i.e., a cable) that extends through the length of the hollow body portion, such as the positive trunk bus line 134 or the negative trunk bus line 136. The socket may define a continuous channel through the housing 214, or the socket can be formed from halves or shells of the connector housing 214 joined to form a channel.

Conductors (e.g., the positive and negative trunk bus lines 134 & 136) are secured within the socket by shear bolt fasteners 220 that extend through passages 215 in the connector housing 214 to penetrate through the conductor insulation and into the interior of the conductor material. In this manner, the fasteners 220 establish metal-to-metal conductive contact between the conductor interior and the connector housing 214.

The head 222 of the shear-bolt fasteners 220, and in some cases part of the stem 224, is designed to shear off when the fasteners 220 are subjected to a predetermined torsion load. At least a portion of the shear-bolt stem 224 remains within the passage 215 after shearing. Preferably, the fastener 220 shears such that the stem 224 does not extend beyond the exterior surface of the connector housing 214. Notably, the connector 210 is not limited to a shear bolt connector, and the taps 212 can likewise be formed in other types of connectors and used to support the bus systems disclosed herein.

The solar panel arrays 110 are placed in electrical communication with the multi-tap connector 210 and trunk bus 130 by inserting portions of the wire harnesses 214 into the connector taps 212. In particular, insulation is stripped from a portion of photovoltaic wire extending from the wire harness 214, and the exposed photovoltaic wire is placed within the tap 212 and held in place with a set screw (not shown). This places the photovoltaic wire harness 114 in electrical communication with the connector housing 214 and the conductor within the socket (i.e., the positive or negative trunk bus line 134 & 136).

The example multi-tap shear bolt connector 210 embodiment shown in the attached Figures allows four panel arrays 110 to connect to an initial feeder bus line or a trunk bus line 130, which increases the number of connection points on a bus line compared to use of combiner boxes. Increasing the number of connection points avoids the substantial heat generation that occurs at combiner boxes that might otherwise accept input from tens of panel arrays 110.

Figure 17A:
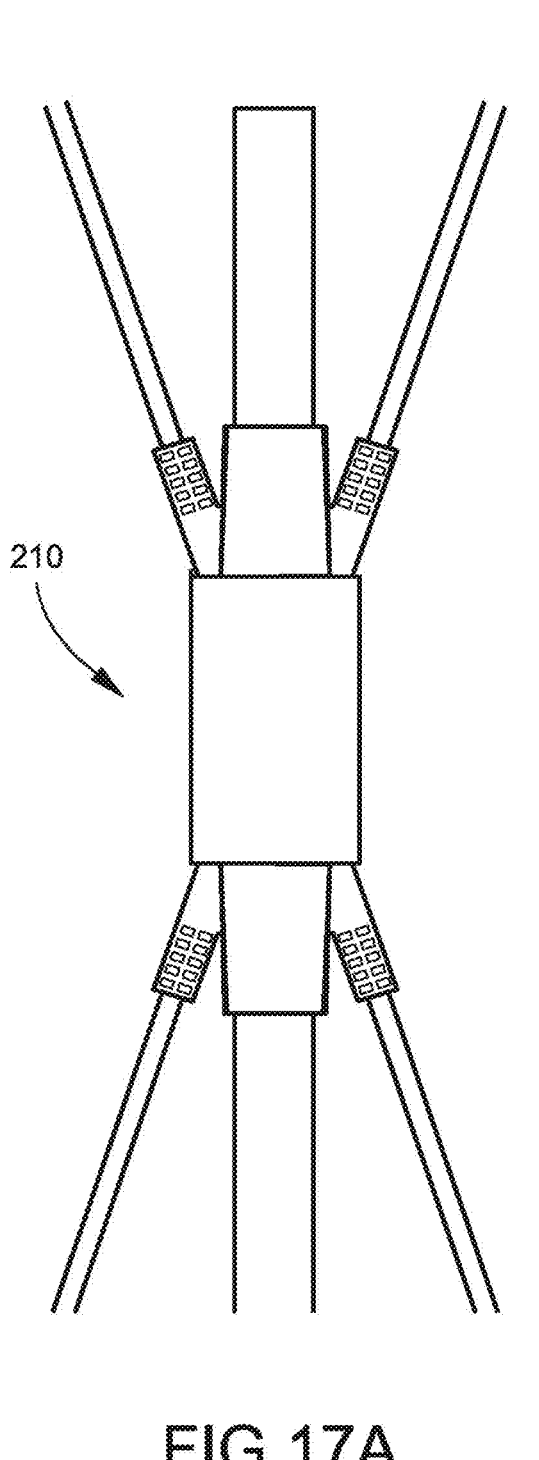
FIG. 17A is an example heat-shrink boot encapsulating a multi-tap connector according to one embodiment.
Figure 17B:
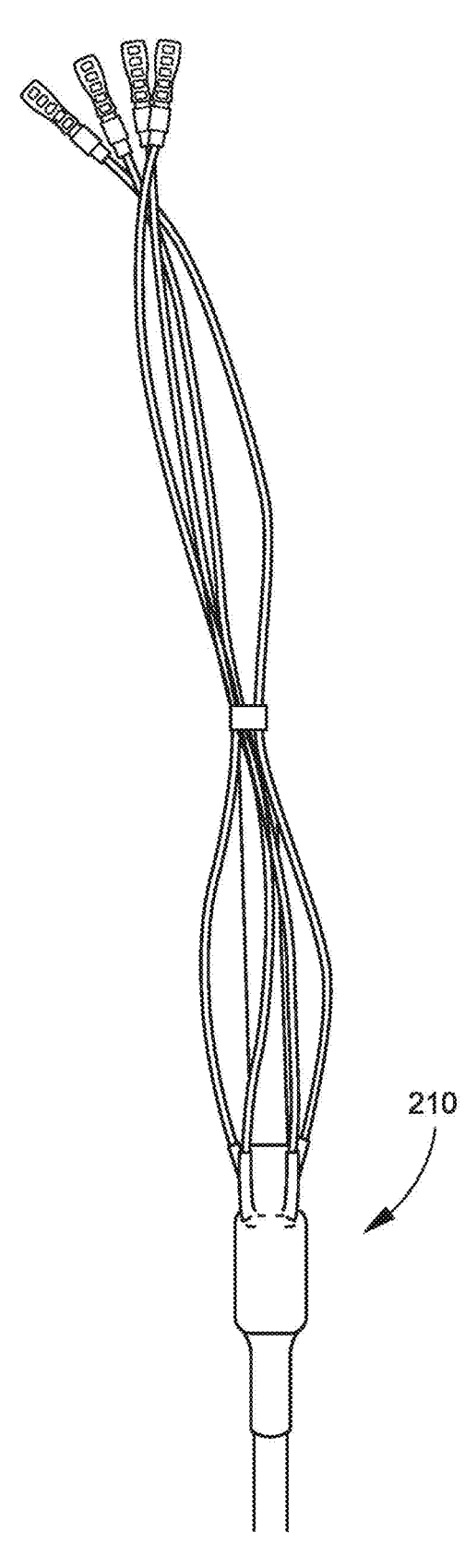
FIG. 17B is an example heat-shrink boot encapsulating a multi-tap connector according to one embodiment.

Once the multi-tap connector 210 is installed on a bus line, it can be sealed with an insulating material to provide mechanical support, electrical isolation, and protection from moisture (i.e., ingress protection) or other weather elements. The sealing can be accomplished prior to field installation using, for example, a molded thermoplastic elastomer, a molded thermoset elastomer, or a heat-shrink boot that encapsulates the connector 210. An example of a heat-shrink boot encapsulating the connector 210 is depicted in FIGS. 17A-17B. FIG. 17B illustrates the insulation partially covering four conductors (e.g., photovoltaic wires) extending from the taps of the multi-tap connector.

In other embodiments, the connector 210 can be provided with a sealing kit adapted for field use and installation. The field sealing kit can include an insulating sleeve, a tape, or a semi-solid paste or gel that is applied to the connector and heat-dried to shrink or conform the insulating material to the connector 210. The insulating material can be a cross-linked polyethylene or another suitable insulating polymer material. The connection can also be sealed utilizing a factory-installed heat shrink polyolefin boot that is custom designed to encapsulate the connector body and the taps 212, as shown in FIGS. 17A-17B.

Multi-Tap Connector Experimental Results

Temperature cycle testing was performed on the above-described the multi-tap shear bolt connector. The connector embodiment tested was sized at 1,000 kilo-circular mils ("kcmil") and designed to accommodate a current of 200 A. The taps were sized to receive 8 American Wire Gauge ("AWG") conductors and rated to handle current loads of approximately 40 A per tap. This sizing ensures the individual taps are well suited to receive photovoltaic wire coming from the solar panel arrays that typically carry currents between 6 A to 10 A per array under routine field operating conditions.

The first test, Test 1, was conducted on a 1,000 kcmil connector with four shear bolts and a full connector with eight shear bolts. Test 1 utilized two pieces of 750 kcmil aluminum cable coupled at one end to the connector and coupled at the other end to a current source. No photovoltaic cables were inserted into taps on the connectors. Current was first applied at 400 A and increased 50 A every eight hours until reaching a maximum current of 580 A. The current was applied over the course of a week with the current turned on during the day and off at night to simulate real-world solar field current generating conditions.

Figure 18:
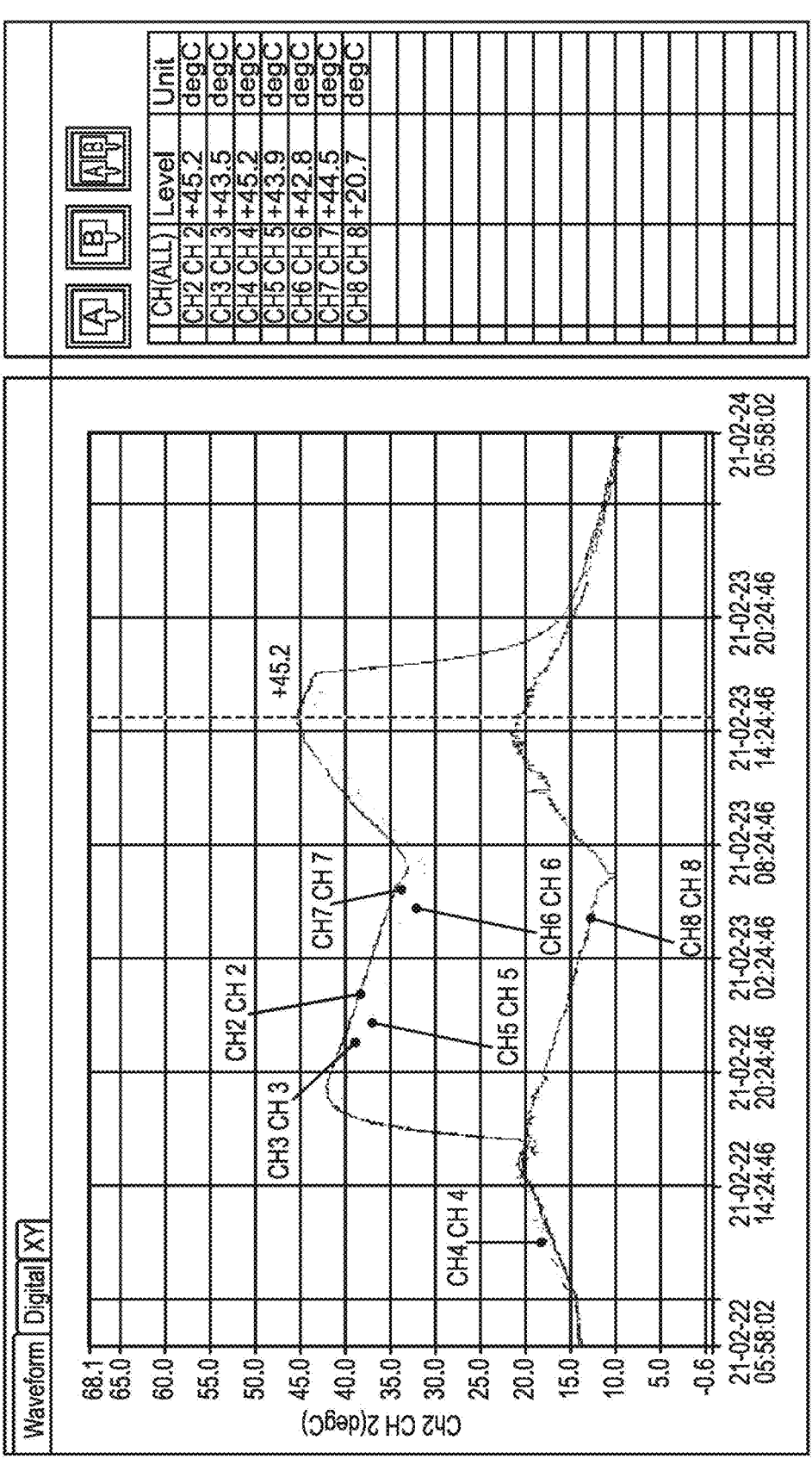
FIG. 18 illustrates temperature cycling test results of a connector.

Thermocouples were placed at various locations on the connector and conductors to measure temperature. The temperature readings are shown in FIG. 18 where the channel readings are as follows: (1) CH2—inside the connector close to a shear bolt; (2) CH3—on the insulation of a 750 kcmil cable close to the connector; (3) on the conductive material of a 750 kcmil cable by inserting the thermocouple through a cut on the cable; (4) CH 5, CH6, and CH7 at the same locations as (1) to (3) on the full connector; and (5) CH8 as the ambient temperature. The experimental results are reflected in FIG. 18 and show a maximum temperature of 45.2 degrees Celsius (° C.).

Figure 19:
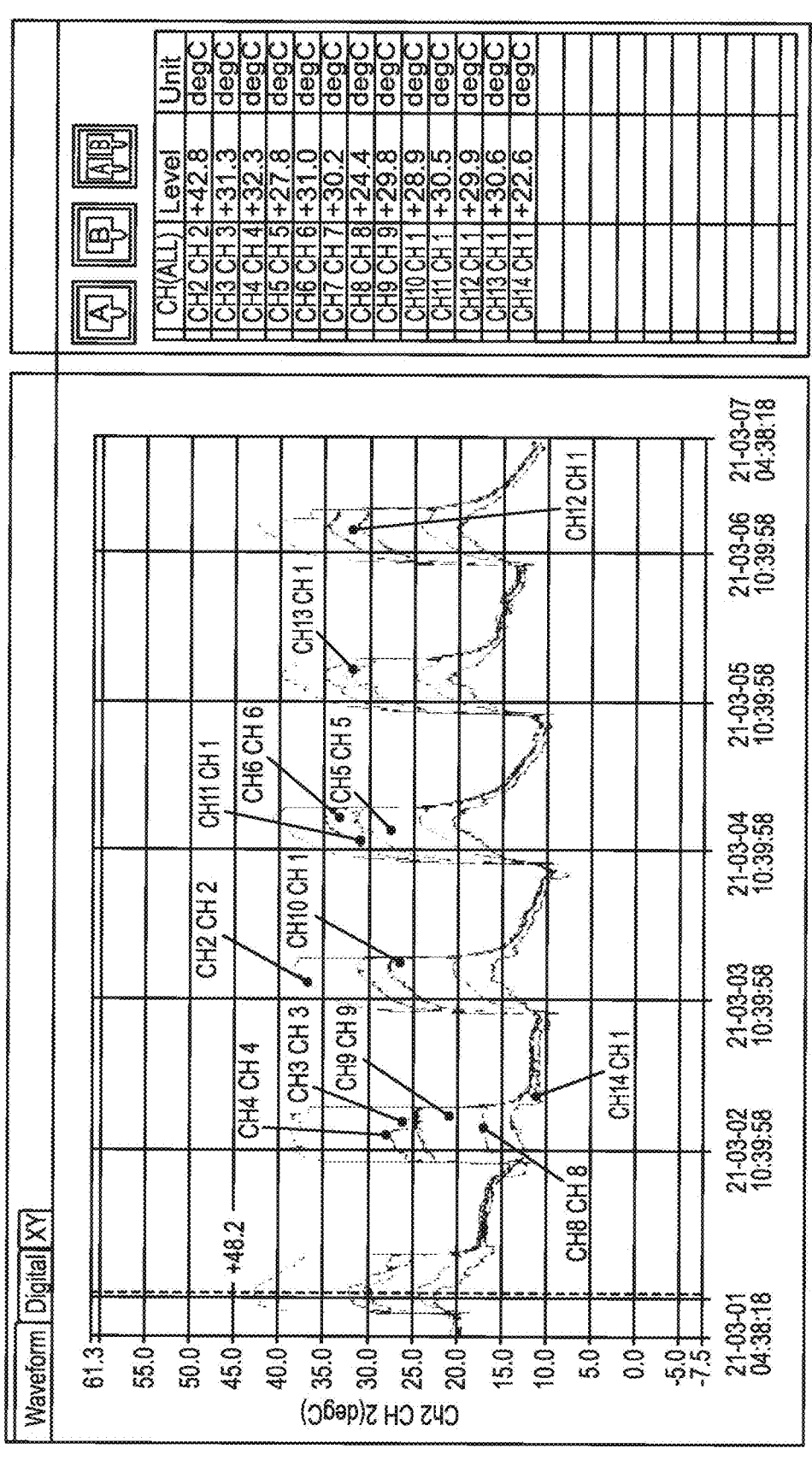
FIG. 19 illustrates temperature cycling test results of a multi-tap connector according to one embodiment.

A second experiment, Test 2, was conducted using a full 1,000 kcmil connector with four taps connected to 8 AWG photovoltaic wires of equal length. Current was run through the 8 AWG photovoltaic wires with no 750 kcmil conductor cable inside of the connector socket. During temperature cycling, the connector was subjected to a 240 A current during the day with the current being removed at night to simulate real-world solar power generation cycling conditions. The current was assumed to be evenly distributed among the four taps at 60 A per tap. The current was delivered through 8 AWG wire secured to each tap. The temperature curves are shown in FIG. 19 where each curve represents the temperature at a different location on the connector and conductors.

Temperature was measured using thermocouples affixed to various locations on the connector and the conductors. With reference to FIG. 19, temperatures at the four taps are represented by curves CH2, CH5, CH8, and CH11. The temperature was also measured at the top of the 8 AWG wire insulation close to the connector as represented by curves CH3, CH6, CH9, and CH12. Temperature was further measured on the actual conductor material of the 8 AWG wires by inserting a thermocouple through a slit in the insulation, and conductor temperature is represented by curves CH4, CH7, CH10, and CH13. The ambient temperature is represented by curve CH14.

The experimental test results showed that the multi-tap shear bolt connector was able to conduct electric current without excessive temperature rise. The highest temperature at one of the 8 AWG inputs was approximately 32.3 degrees Celsius (° C.) when the ambient temperature was 22.6° C.

Lastly, a third experiment, Test 3, was conducted by applying a current to the 750 kcmil aluminum photovoltaic conductor cable housed within a connector socket and the four 8 AWG photovoltaic wires secured within the connector taps. Test 3 began with 60 A applied to each of the 8 AWG photovoltaic wires and a current of 505 A applied to the 750 kcmil conductor cable. Current was increased on the 8 AWG photovoltaic wires to 70 A and increased to 590 A on the 750 kcmil conductor cable.

Thermocouples were used to measure the temperature at various locations with the corresponding temperature readings shown in FIG. 20 as follows: (1) CH2—measured at a connection point of one of the 8 AWG photovoltaic wires and the connector; (2) CH3—on the conductive material of the 8 AWG photovoltaic wire by inserting a thermocouple through a cut in the wire insulation; (3) CH4—on top of the 750 kcmil conductor cable insulation close to the connector; (4) CH5—on the surface of the connector near the shear bolts; (5) CH6—on the conductive material of the positive current 750 kcmil cable by inserting a thermocouple through a cut in the wire insulation; (6) CH7—on the insulation of the positive side of the 750 kcmil cable near location CH6; (7) CH8—on the conductive material of the negative side of the 750 kcmil cable by inserting a thermocouple through a cut in the wire insulation; (8) CH9—on the insulation of the negative side of the 750 kcmil cable near location CH8; and (9) CH10—the ambient temperature.

Figure 20:
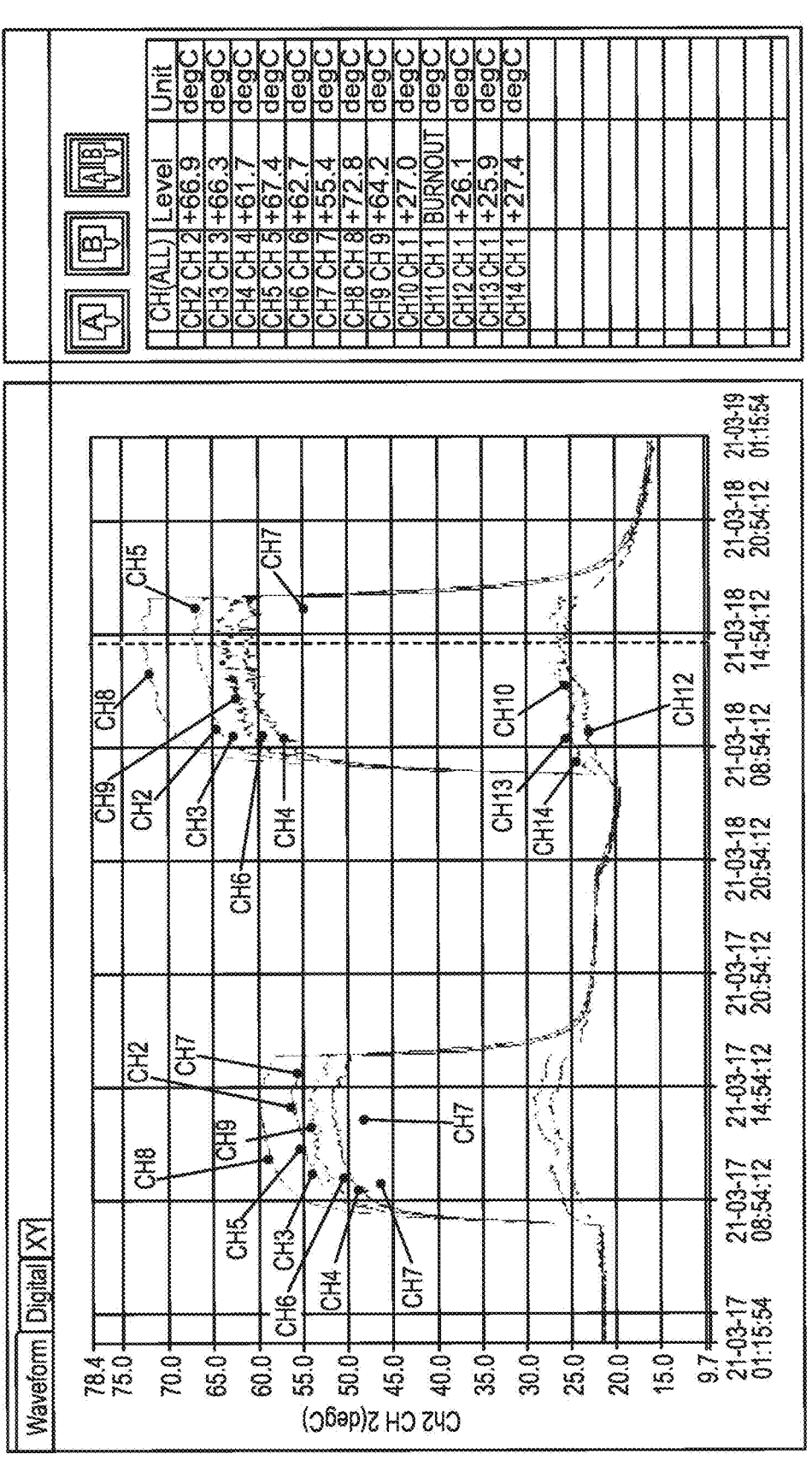
FIG. 20 illustrates temperature cycling test results of a multi-tap connector according to one embodiment.

FIG. 20 depicts the experimental results for the high current conditions of Test 3. The highest temperature was 72.8° C. at the 750 kcmil conductor cable when the ambient temperature was 27.4° C. The 8 AWG photovoltaic wires showed stable temperature performance and stayed below 30° C. All measured temperatures stayed below 90° C. indicating that the connector could maintain performance without heat failure under high current conditions.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A ruggedized cable, comprising:
  (a) an elongated, cylindrical steel member coated with aluminum, wherein the cylindrical steel member is surrounded by a plurality of conductor strands;
  (b) a first insulation layer that encases conductor strands and the cylindrical steel member, wherein the first insulation layer (i) is comprised of cross-linked polyethylene (XLPE), (ii) has a thickness from 73 mils to 132 mils, and (iii) is black; and
  (c) a second insulation layer deposited on the first insulation layer, wherein the second insulation layer (i) is comprised of high-density polyethylene (HDPE), (ii) has a thickness from 13 mils to 23 mils, and (iii) comprises a color additive.

2. The ruggedized cable of claim 1, wherein the cylindrical steel member is surrounded by 7 to 90 conductor strands.

3. The ruggedized cable of claim 1, wherein the cylindrical steel member and conductor strands have a combined diameter between 132 mils and 1196 mils.

4. The ruggedized cable of claim 1, wherein the first and second insulation layers are formed by simultaneously extruding HDPE over XLPE.

5. The ruggedized cable of claim 4, wherein the first and second insulation layers are formed using a single extrusion head that simultaneously extrudes the HDPE over the XLPE.

6. A ruggedized cable, comprising:
  (a) an elongated conductive member surrounded by a plurality of conductor strands;
  (b) a first insulation layer that disposed over the conductor strands and over the elongated conductive member, wherein the first insulation layer (i) comprises cross-linked polyethylene (XLPE), (ii) has a thickness from 73 mils to 132 mils, and (iii) is black; and
  (c) a second insulation layer disposed on the first insulation layer, wherein the second insulation layer (i) comprises high-density polyethylene (HDPE), (ii) has a thickness from 13 mils to 23 mils, and (iii) comprises a color additive.

7. The ruggedized cable of claim 6, wherein the elongated conductive member is formed from steel and coated with aluminum.

8. The ruggedized cable of claim 6, wherein the elongated conductive member, the plurality of conductor strands, the first insulation layer, and the second insulation layer have a combined diameter between 304 mils to 1507 mils.

9. The ruggedized cable of claim 6, wherein the first and second insulation layers are formed by simultaneously extruding HDPE over XLPE.

10. The cable of claim 6, wherein the first insulation layer is black and the second insulation layer is comprised of a color additive.

11. A ruggedized cable, comprising:
  (a) an elongated conductive member coated with aluminum and surrounded by a plurality of conductor strands;

(b) a first insulation layer that encases the conductor strands and the elongated conductive member, wherein the first insulation member (i) comprises cross-linked polyethylene (XLPE), (ii) has a thickness from 13 mils to 23 mils, and (iii) comprises a color additive; and (c) a second insulation layer formed over the first insulation layer, wherein the second insulation member (i) comprises high-density polyethylene (HDPE), (ii) has a thickness from 13 mils to 23 mils, and (iii) comprises a color additive.

12. The ruggedized cable of claim 11, wherein the elongated conductive member is formed from a material comprising steel.

13. The ruggedized cable of claim 11, wherein the first and second insulation layers are formed by simultaneously extruding HDPE over XLPE.

14. The ruggedized cable of claim 11, wherein the elongated conductive member, the plurality of conductor strands, the first insulation layer, and the second insulation layer have a combined diameter between 304 mils to 1507 mils.

\* \* \* \* \*